United States Patent
Sakamoto

(10) Patent No.: US 8,587,830 B2
(45) Date of Patent: Nov. 19, 2013

(54) IMAGE PROCESSING APPARATUS, IMAGE FORMING APPARATUS, IMAGE PROCESSING METHOD AND RECORDING MEDIUM

(75) Inventor: Akira Sakamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 895 days.

(21) Appl. No.: 12/756,759

(22) Filed: Apr. 8, 2010

(65) Prior Publication Data

US 2010/0259771 A1    Oct. 14, 2010

(30) Foreign Application Priority Data

Apr. 9, 2009  (JP) ................................ 2009-095181

(51) Int. Cl.
*G06F 15/00*  (2006.01)

(52) U.S. Cl.
USPC ............... 358/1.9; 358/1.2; 358/2.1; 382/162

(58) Field of Classification Search
USPC ................ 358/1.9, 2.1, 3.27, 1.2, 1.13, 1.15; 382/255, 256, 260, 266, 269, 299, 162
See application file for complete search history.

(56) References Cited

FOREIGN PATENT DOCUMENTS

| JP | 2000-246862 A | 9/2000 |
|----|---------------|--------|
| JP | 2004-223850 A | 8/2004 |
| JP | 2004-246639 A | 9/2004 |

*Primary Examiner* — Vu B Hang
(74) *Attorney, Agent, or Firm* — Birch, Stewart, Kolasch & Birch, LLP

(57) ABSTRACT

When input image data is high-resolution data, the input image data is downsampled to low-resolution data. Subsequently, it is judged whether or not the trapping process is performed with respect to an edge extracted based on the image data after the downsampling. When the trapping process is performed, a trap color is determined. Pixel data based on the determined trap color is upsampled based on the resolution of the input image data. Then, the trapping process is performed based on the input image data and the pixel data after the upsampling.

12 Claims, 26 Drawing Sheets

| -1 | -1 | 0 | 1 | 1 |
|----|----|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG. 7B

| -1 | -1 | -1 | -1 | -1 |
|----|----|----|----|----|
| -1 | -1 | -1 | -1 | -1 |
| 0  | 0  | 0  | 0  | 0  |
| 1  | 1  | 1  | 1  | 1  |
| 1  | 1  | 1  | 1  | 1  |

FIG. 8

| | 4 | 5 | 6 | 7 | 8 | 9 |
|---|---|---|---|---|---|---|

| | | | | | | |
|---|---|---|---|---|---|---|
| 5 | 0   0<br>0   0 | 255  −255<br>255  −255 | 765  −765<br>765  −765 | 1275 −1275<br>1275 −1275 | 1530 −1530<br>1530 −1530 | 255  −255<br>1530 −1530 |
| 6 | 255  −255<br>255  −255 | 765  −765<br>765  −765 | 1275 −1275<br>1275 −1275 | 1530 −1530<br>1530 −1530 | 1530 −1530<br>1530 −1530 | 0   0<br>1275 −1275 |
| 7 | 765  −765<br>765  −765 | 1275 −1275<br>1275 −1275 | 1530 −1530<br>1530 −1530 | 1530 −1530<br>1530 −1530 | 1275 −1275<br>1275 −1275 | −510  510<br>765  −765 |
| 8 | 1275 −1275<br>1275 −1275 | 1530 −1530<br>1530 −1530 | 1530 −1530<br>1530 −1530 | 1275 −1275<br>1275 −1275 | 765  −765<br>765  −765 | −1020 1020<br>255  −255 |
| 9 | 1275 −1275<br>510  −510 | 1530 −1530<br>255  −255 | 1275 −1275<br>0   0 | 765  −765<br>−510  510 | 255  −255<br>−1020 1020 | −1020 1020<br>−1020 1020 |
| 10 | 1275 −1275<br>765  −765 | 1275 −1275<br>−1275 1275 | 765  −765<br>−1785 1785 | 255  −255<br>−2295 2295 | 0   0<br>−2550 2550 | −765  765<br>−2040 2040 |

| C | M |
|---|---|
| EDGE<br>INTENSITY IN<br>MAIN−SCANNING<br>−DIRECTION | EDGE<br>INTENSITY IN<br>MAIN−SCANNING<br>−DIRECTION |
| C | M |
| EDGE<br>INTENSITY IN<br>SUB−SCANNING<br>−DIRECTION | EDGE<br>INTENSITY IN<br>SUB−SCANNING<br>−DIRECTION |

FIG. 13

|   | 4 | | 5 | | 6 | | 7 | | 8 | | 9 | |
|---|---|---|---|---|---|---|---|---|---|---|---|---|
| 5  | 0 | 0 | 0 | 255 | 0 | 255 | 0 | 255 | 0 | 255 | 128 | 128 |
|    | 0 | 0 | 64 | 191 | 191 | 64 | 255 | 0 | 255 | 0 | 0 | 255 |
| 6  | 0 | 255 | 0 | 255 | 0 | 255 | 0 | 255 | 255 | 0 | 204 | 51 |
|    | 64 | 191 | 191 | 64 | 255 | 0 | 255 | 0 | 0 | 255 | 77 | 179 |
| 7  | 0 | 255 | 0 | 255 | 0 | 255 | 255 | 0 | 255 | 0 | 255 | 0 |
|    | 191 | 64 | 255 | 0 | 255 | 0 | 0 | 255 | 0 | 255 | 128 | 128 |
| 8  | 0 | 255 | 0 | 255 | 255 | 0 | 255 | 0 | 255 | 0 | 255 | 0 |
|    | 255 | 0 | 255 | 0 | 0 | 255 | 0 | 255 | 64 | 191 | 128 | 128 |
| 9  | 0 | 255 | 128 | 128 | 204 | 51 | 255 | 0 | 255 | 0 | 255 | 0 |
|    | 128 | 128 | 0 | 255 | 77 | 179 | 128 | 128 | 128 | 128 | 64 | 191 |
| 10 | 191 | 64 | 255 | 0 | 255 | 0 | 255 | 0 | 255 | 0 | 255 | 0 |
|    | 0 | 255 | 0 | 255 | 0 | 255 | 0 | 255 | 0 | 255 | 0 | 255 |

| C | M |
|---|---|
| PIXEL VALUE ON CURRENT SIDE | PIXEL VALUE ON CURRENT SIDE |
| C | M |
| PIXEL VALUE ON OPPOSITE SIDE | PIXEL VALUE ON OPPOSITE SIDE |

FIG. 14

| | 4 | 5 | 6 | 7 | 8 | 9 |
|---|---|---|---|---|---|---|

| | | | | | | |
|---|---|---|---|---|---|---|
| 5 | 0    0 / 0 | 105    1 / 124 | 105    1 / 160 | 105    1 / 179 | 105    1 / 179 | 142    0 / 105 |
| 6 | 105    1 / 124 | 105    1 / 160 | 105    1 / 179 | 105    1 / 179 | 179    0 / 105 | 164    0 / 127 |
| 7 | 105    1 / 160 | 105    1 / 179 | 105    1 / 179 | 179    0 / 105 | 179    0 / 105 | 179    0 / 142 |
| 8 | 105    1 / 179 | 105    1 / 179 | 179    0 / 105 | 179    0 / 105 | 179    0 / 124 | 179    0 / 142 |
| 9 | 105    1 / 142 | 142    0 / 105 | 164    0 / 127 | 179    0 / 142 | 179    0 / 142 | 179    0 / 124 |
| 10 | 160    0 / 105 | 179    0 / 105 | 179    0 / 105 | 179    0 / 105 | 179    0 / 105 | 179    0 / 105 |

LUMINANCE VALUE L ON CURRENT SIDE    TRAP JUDGMENT

LUMINANCE VALUE L ON OPPOSITE SIDE

FIG. 15
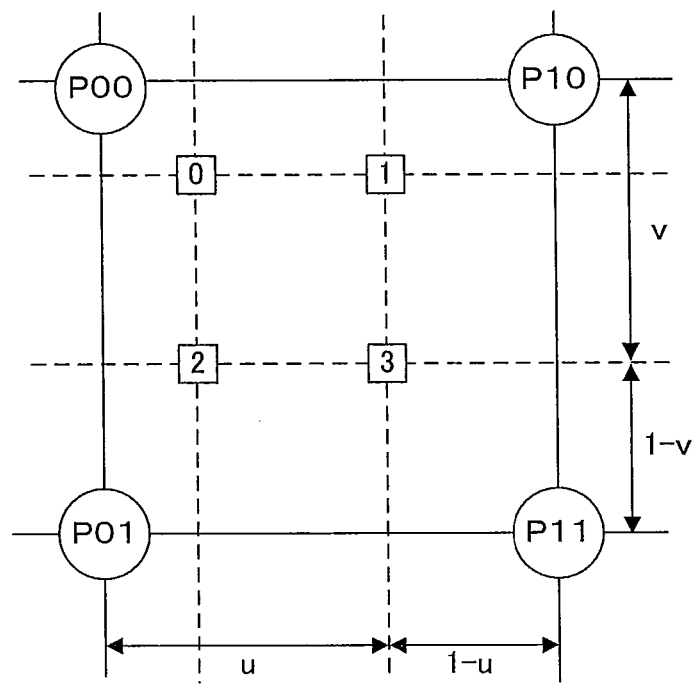
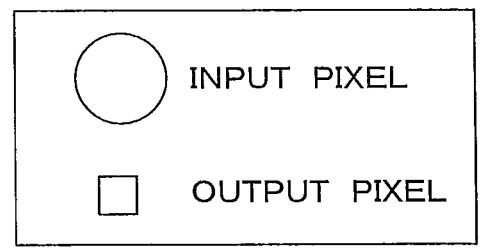

▤ COLOR DIFFERENCE IS CLOSER TO M

▥ COLOR DIFFERENCE IS CLOSER TO C

▩ COLOR DIFFERENCE IS INTERMEDIATE VALUE BETWEEN C AND M

IMAGE PROCESSING APPARATUS, IMAGE FORMING APPARATUS, IMAGE PROCESSING METHOD AND RECORDING MEDIUM

CROSS-REFERENCE TO RELATED APPLICATIONS

This Nonprovisional application claims priority under 35 U.S.C. §119(a) on Patent Application No. 2009-95181 filed in Japan on Apr. 9, 2009, the entire contents of which are hereby incorporated by reference.

BACKGROUND

1. Technical Field

The present invention relates to an image processing apparatus, an image forming apparatus, an image processing method, and a recording medium recording a computer program for performing a process for superimposing pixel data of a plurality of color components.

2. Description of Related Art

In order to prevent degradation of image quality of an image formed on a paper medium by an image forming apparatus such as a copier or a printer, a trapping process and a smoothing process are proposed. A process for superimposing pixel data of a plurality of color components on each other (hereinafter referred to as a trapping process) is a process for preventing white gaps from appearing when a misregistration occurs and a page background has been exposed. The smoothing process is a process for improving resolution while reducing a jaggy (stair-stepping edges appearing in curved or sloping lines of text or an image).

When an image forming apparatus performs image formation at high resolution based on low-resolution input image data, it is necessary to perform the trapping process with respect to the image data which is converted to high-resolution image data in order to prevent degradation of image quality. As a result, since the image forming apparatus needs a memory for storing the image data which is converted to the high-resolution image data, the problem occurs that a circuit scale is increased.

Consequently, an invention capable of performing the trapping process while controlling an increase in the circuit scale without causing a reduction in a processing speed has been proposed (for example, Japanese Patent Application Laid Open No. 2004-223850). In such an image forming apparatus, a buffer for the trapping process is shared with a buffer for input image data, thereby preventing an increase in the circuit scale, and preventing a reduction in the processing speed by performing the trapping process after conversion to bitmap data.

SUMMARY

However, in the structure described in Japanese Patent Application Laid Open No. 2004-223850, since the trapping process is performed based on the bitmap data after the resolution thereof is converted, when the input image data has high resolution, a buffer for the high-resolution data is required so that it is not possible to reliably prevent the increase in the circuit scale. In addition, it is considered that the size of the buffer is reduced by temporarily converting the high-resolution input image data to low-resolution data (hereinafter referred to as downsampling). However, in this case, high-resolution information is absent, which leads to the degradation of image quality.

The present invention has been made with the aim of solving the above problems, and it is an object of the present invention to provide an image processing apparatus, an image forming apparatus, and an image processing method, and a recording medium recording a computer program which are capable of executing the trapping process with respect to high-resolution image data without increasing the circuit scale.

An image processing apparatus according to the present invention is an image processing apparatus which performs, when output image data is generated from input image data having a plurality of color components, a process for superimposing a pixel having the plurality of color components with respect to an edge extracted based on the input image data, comprising: a first resolution judgment section for judging whether or not resolution of input image data is not less than a predetermined value; a first conversion section for converting resolution of the input image data to resolution less than the predetermined value when the first resolution judgment section judges that the resolution of the input image data is not less than the predetermined value; a process judgment section for judging whether or not the process for superimposing a pixel having a plurality of color components is performed with respect to an edge extracted based on the image data after conversion by the first conversion section; a determination section for determining a color component of the pixel to be superimposed when the process judgment section judges that the process for superimposing is performed; a second conversion section for converting resolution of pixel data based on the color component determined by the determination section to the resolution of the input image data; and a superimposing section for performing a process for superimposing the input image data on the pixel data after conversion by the second conversion section.

An image processing apparatus according to the present invention is characterized by further comprising: a reception section for receiving resolution of output image data; a second resolution judgment section for judging whether or not the resolution received by the reception section is not less than the predetermined value; and a third conversion section for converting resolution of the input image data to the resolution received by the reception section when the first resolution judgment section judges that the resolution is less than the predetermined value, and the second resolution judgment section judges that the resolution received by the reception section is not less than the predetermined value, wherein the process judgment section judges whether or not the process for superimposing is performed with respect to the input image data when the third conversion section converts the resolution of the input image data to the resolution received by the reception section, the second conversion section converts the resolution of the pixel data based on the color component determined by the determination section to the resolution received by the reception section, and the superimposing section superimposes the pixel data after conversion by the second conversion section on the image data after conversion by the third conversion section to generate the output image data.

An image processing apparatus according to the present invention is characterized in that the third conversion section: generates an interpolation pixel for the input image data; calculates a color difference between the generated interpolation pixel and a pixel of the input image data closest to the interpolation pixel; changes a pixel value of the interpolation pixel to a pixel value of the pixel of the input image data when the calculated color difference is less than a predetermined value; and changes the pixel value of the interpolation pixel to a pixel value of a pixel of the input image data situated at a predetermined position relative to the interpolation pixel when the calculated color difference is not less than the predetermined value.

An image forming apparatus according to the present invention is an image forming apparatus, comprising: the image processing apparatus according to the present invention; and an image forming section for performing image formation based on output image data generated by the image processing apparatus.

An image processing method according to the present invention is an image processing method for performing, when output image data is generated from input image data having a plurality of color components, a process for superimposing a pixel having the plurality of color components with respect to an edge extracted based on the input image data, comprising: a step of judging whether or not resolution of input image data is not less than a predetermined value; a step of converting resolution of the input image data to resolution less than the predetermined value when it is judged that the resolution of the input image data is not less than the predetermined value; a judgment step of judging whether or not the process for superimposing a pixel having a plurality of color components is performed with respect to an edge extracted based on the image data after conversion; a step of determining a color component of the pixel to be superimposed when it is judged that the process for superimposing is performed; a step of converting resolution of pixel data based on the determined color component to the resolution of the input image data; and a step of performing a process for superimposing the input image data on the pixel data after conversion.

An image processing method according to the present invention is characterized by further comprising: a reception step of receiving resolution of output image data; a step of judging whether or not the received resolution is not less than a predetermined value; a conversion step of converting resolution of the input image data to the received resolution when it is judged that the resolution of the input image data is less than the predetermined value, and the received resolution is not less than the predetermined value; a step of judging whether or not the process for superimposing is performed with respect to the input image data when the resolution of the input image data is converted to the received resolution; a step of converting resolution of the pixel data based on the determined color component to the received resolution; and a step of performing a process for superimposing the pixel data after conversion on the image data after conversion.

An image processing method according to the present invention is characterized in that the conversion step includes: generating an interpolation pixel for the input image data; calculating a color difference between the generated interpolation pixel and a pixel of the input image data closest to the interpolation pixel; changing a pixel value of the interpolation pixel to a pixel value of the pixel of the input image data when the calculated color difference is less than a predetermined value; and changing the pixel value of the interpolation pixel to a pixel value of a pixel of the input image data situated at a predetermined position relative to the interpolation pixel when the calculated color difference is not less than the predetermined value.

A recording medium recording a computer program according to the present invention is a computer-readable recording medium recording a computer program which causes a computer to perform, when output image data is generated from input image data having plurality of color components, a process for superimposing a pixel having the plurality of color components with respect to an edge extracted based on the input image data, the computer program comprising: a resolution judgment step of causing the computer to judge whether or not resolution of input image data is not less than a predetermined value; a first conversion step of causing the computer to convert resolution of the input image data to resolution less than the predetermined value when it is judged that the resolution of the input image data is not less than the predetermined value at the resolution judgment step; a process judgment step of causing the computer to judge whether or not the process for superimposing a pixel having a plurality of color components is performed with respect to an edge extracted based on the image data after conversion at the first conversion step; a determination step of causing the computer to determine a color component of the pixel to be superimposed when it is judged that the process for superimposing is performed at the process judgment step; a second conversion step of causing the computer to convert resolution of pixel data based on the color component determined at the determination step to the resolution of the input image data; and a superimposition step of causing the computer to perform a process for superimposing the input image data on the pixel data after conversion at the second conversion step.

In the present invention, when the resolution of the input image data is not less than a predetermined value, the resolution of the input image data is converted to the resolution lower than the predetermined value (downsampling). Subsequently, it is judged whether or not a process for superimposing pixels of a plurality of color components (trapping process) is performed with respect an edge extracted based on the image data after the conversion. When the processing for superimposing is performed, a color for the superimposition (trap color) is determined. The pixel data of the determined color component is converted based on the resolution of the input image data (upsampling). Then, the process for superimposing the input image data on the pixel data after the conversion is performed to generate output image data.

In other words, high-resolution input image data is converted to low-resolution image data, it is judged whether or not the trapping process is performed with respect to the low-resolution image data (hereinafter referred to as a trap judgment), and the trap color and a trap area are calculated using the low-resolution image data. Then, the trapping process is performed using the original high-resolution image data. This allows control of an increase in the circuit scale resulting from an increase in a memory required when the trap judgment and the like are performed using the high-resolution image data. In addition, since only the trap judgment is performed using the low-resolution image data, it is also possible to reduce the occurrence of problems such as the absence of information on output image data and the image quality degradation of the output image data resulting from the downsampling of the input image data.

In the present invention, when the resolution of the input image data is not more than the predetermined value, and set resolution is higher than that of the input image data, i.e., when low-resolution input image data is outputted at high resolution, the resolution of the input image data is converted to the set resolution (upsampling). In addition, the trap judgment is performed with respect to the input image data in a state where the input image data is still low-resolution image data. When the trap judgment is performed, the color component and an area of superimposition are determined, and pixel data of the determined color component and area of superimposition is converted based on the set resolution (upsampling). The process for superimposing image data obtained by this process on the input image data which is converted to high-resolution image data is performed.

Thus, when the input image data is low-resolution image data, the trap judgment is performed in the sate where the input image data is still low-resolution image data, and the trap color and the trap area are calculated. Subsequently, the trapping process is performed with respect to the image data obtained by converting the resolution of the input image data to the high resolution. This allows the control of the increase in the circuit scale.

In the present invention, an interpolation pixel is generated for low-resolution input image data, and a color difference between the generated interpolation pixel and a pixel of the input image data closest to the interpolation pixel is calculated. Then, when the calculated color difference is less than a predetermined value, a pixel value of the interpolation pixel is changed to the pixel value of the pixel of the input image data. When the calculated color difference is not less than the predetermined value, the pixel value of the interpolation pixel is changed to the pixel value of the pixel of the input image data at a predetermined position relative to the interpolation pixel. With this process, it is possible to increase the resolution of the low-resolution input image data to high resolution by reducing image blurring and a jaggy of the low-resolution input image data.

According to the present invention, high-resolution input image data is converted to low-resolution image data, it is judged whether or not the trapping process is performed with respect to the low-resolution image data (hereinafter referred to as the trap judgment), and the trap color and the trap area are calculated using the low-resolution image data. Subsequently, the trapping process is performed using the original high-resolution image data. This allows the control of the increase in the circuit scale resulting from the increase in the memory required when the trap judgment and the like are performed using the high-resolution image data. Further, since only the trap judgment is performed using the low-resolution image data, it is possible to reduce the occurrence of problems such as the absence of information on the output image data and the image quality degradation of the output image data resulting from the downsampling of the input image data.

The above and further objects and features will more fully be apparent from the following detailed description with accompanying drawings.

BRIEF DESCRIPTION OF THE SEVERAL VIEWS OF THE DRAWINGS

FIG. 6 is a view schematically illustrating an example of input image data;

FIG. 7A is a view schematically illustrating an example of a differential filter used for a main scanning direction;

FIG. 7B is a view schematically illustrating an example of a differential filter used for a sub-scanning direction;

FIG. 8 is a view illustrating a part of a result of calculation of an edge intensity with respect to the input image data of FIG. 6 by using the differential filters of FIGS. 7A and 7B;

FIG. 13 is a view illustrating a part of a result of calculation of the representative colors on a current side and an opposite side;

FIG. 14 is a view illustrating a part of luminance values calculated based on the representative colors on the current side and the opposite side, and a trap judgment result;

FIG. 15 is a schematic view for explaining data interpolation in a smoothing process;

DETAILED DESCRIPTION

A description will be given hereinbelow of a preferred embodiment of an image processing apparatus according to the present invention with reference to the drawings.

Figure 1:
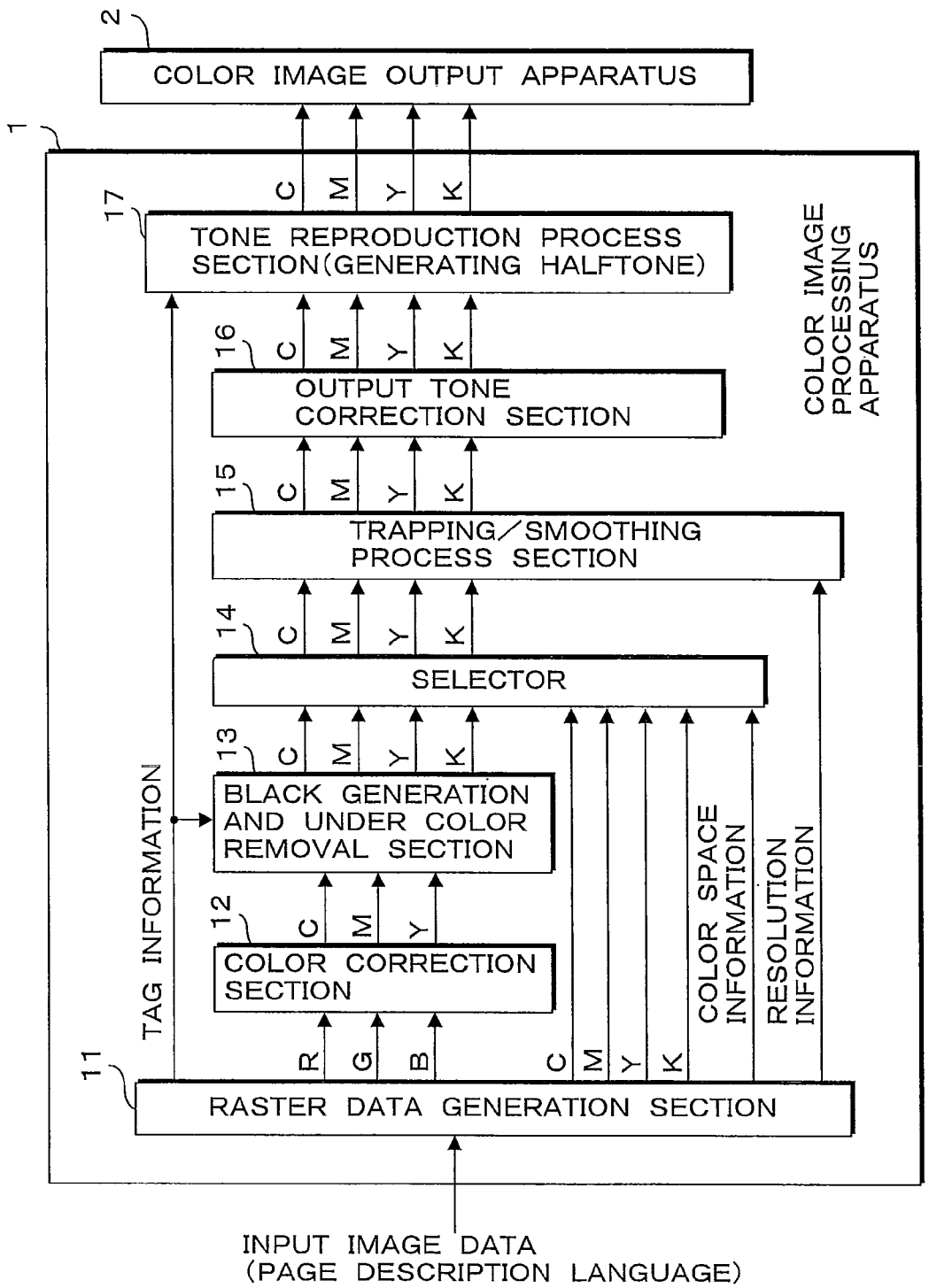
FIG. 1 is a block diagram illustrating a structure of a color image forming apparatus including an image processing apparatus according to the present invention.

FIG. 1 is a block diagram illustrating a structure of a color image forming apparatus including the image processing apparatus according to the present invention. The color image forming apparatus according to the present embodiment performs image processing with respect to inputted image data (hereinafter referred to as input image data), and forms a color image on a sheet such as recording paper or the like based on the image data after the processing. The input image data is produced by using application software such as image editing software on a computer that is not shown. Subsequently, the input image data is converted to a page description language by a printer driver, and is transmitted to the color image forming apparatus from the computer via a network or the like.

As illustrated in FIG. 1, the color image forming apparatus includes a color image processing apparatus 1 for processing the input image data, and a color image output apparatus 2 (image forming section) for forming an image based on the image data processed by the color image processing apparatus 1, and the like. The color image output apparatus 2 is, e.g., an electrophotographic type or inkjet type printer for forming an image on a sheet such as recording paper, an OHP sheet, and the like. It is to be noted that the color image output apparatus 2 may be a displaying apparatus such as a display.

The color image processing apparatus 1 includes a raster data generation section 11, a color correction section 12, a black generation and under color removal section 13, a selector 14, a trapping/smoothing process section 15, an output tone correction section 16, and a tone reproduction process section 17, and the like.

The raster data generation section 11 analyzes the inputted page description language, and generates RGB (R: red, G: green, B: black) or CMYK (C: cyan, M: magenta, Y: yellow, K: black) raster data. When the RGB raster date is generated, the raster data generation section 11 outputs the generated raster data to the color correction section 12. On the other hand, when the CMYK raster data is generated, the raster data generation section 11 outputs the generated raster data to the selector 14.

In addition, the raster data generation section 11 obtains color space information and resolution information of the input image data, and outputs the color space information to the selector 14, and the resolution information to the trapping/smoothing process section 15. Further, the raster data generation section 11 generates tag information indicating to which of a text area, a vector graphics area, a photograph area, and other area respective pixels in the raster data belong, and outputs the tag information to the black generation and under color removal section 13 and the tone reproduction process section 17.

A method for obtaining the resolution information in the color image forming apparatus varies depending on the type of the color image forming apparatus. For example, when the color image forming apparatus is a printer, it obtains the resolution information described in a header of the input image data. When the color image forming apparatus is a multi-functional copier, it obtains the resolution information set through an operation panel (reception section). When the resolution information is not set, the color image forming apparatus obtains default resolution information (e.g., 600 dpi). When the color image forming apparatus is a computer system, it obtains the resolution information set on a read conditions setting screen (scanner driver) for reading an image with a scanner by using a mouse, a keyboard etc.

The color correction section 12 performs a process for removing a color impurity based on spectral characteristics of CMY (C: cyan, M: magenta, Y: yellow) color materials containing a useless absorption component in order to realize faithful color reproduction. The color correction section 12 outputs CMY signals of three colors after the color correction to the black generation and under color removal section 13.

The black generation and under color removal section 13 performs a process for generating a black (K) signal from the CMY signals, and generating new CMY signals by subtracting the generated K signal from the original CMY signals. Then, the black generation and under color removal section 13 converts the CMY signals to CMYK signals, and outputs the CMYK signals after the conversion to the selector 14.

It is to be noted that the black generation and under color removal section 13 generates the black (K) signal using, e.g., a skeleton black process. In this method, when it is assumed that input/output characteristics of a skeleton curve are represented by y=f(x), input data are C, M, and Y, output data are C', M', Y', and K', and an UCR (Under Color Removal) ratio is α (0<α<1), the data output by the black generation and under color removal process are represented by the following expression (1):

$$K'=f\{\min(C,M,Y)\}$$

$$C'=C-\alpha K'$$

$$M'=M-\alpha K'$$

$$Y'=Y-\alpha K' \qquad (1)$$

To the selector 14, the CMYK signals are inputted from the raster data generation section 11 and the black generation and under color removal section 13, and the selector 14 outputs either one of the signals based on the color space information outputted from the raster data generation section 11. When the color space information indicates RGB, the selector 14 outputs the CMYK signals inputted from the black generation and under color removal section 13 to the trapping/smoothing process section 15. When the color space information indicates CMYK, the selector 14 outputs the CMYK signals directly inputted from the raster data generation section 11. Consequently, when the color space information indicates CMYK, the CMYK signals which are not processed in the color correction section 12 or the black generation and under color removal section 13 are inputted to the trapping/smoothing process section 15.

The trapping/smoothing process section 15 performs a trapping process for preventing white gaps caused by misregistration and a smoothing process for improving the resolution while reducing blurred pixels and jaggies, according to the resolution information, for the input raster data. Subsequently, the trapping/smoothing process section 15 outputs the CMYK signals after the processes to the output tone correction section 16. It is to be noted that the trapping/smoothing process section 15 performs the trapping process and the smoothing process in accordance with the resolution of the input image data, and the resolution of the image formed by the color image output apparatus 2 (hereinafter referred to as an output image). A structure and process detail of the trapping/smoothing process section 15 will be described later. As the resolution of the output image, the resolution selected (received) by the operation panel (a default value such as, e.g., 600 dpi when the resolution is not selected) is set in the case of the multi-functional peripheral. In the case of the computer system, the resolution of the output image may be set appropriately using printing conditions (the setting screen of the printer driver).

The output tone correction section 16 performs an output tone correction process based on the characteristics of the color image output apparatus 2, while the tone reproduction process section 17 performs a tone reproduction process (halftone generation) for finally separating the image into pixels to reproduce each tone of the pixels. The tone reproduction process section 17 performs a binarization or multi-level dithering process using a screen suitable for tone reproduction with regard to an area judged to be the photograph area based on the tag information from the raster data generation section 11.

Figure 2:
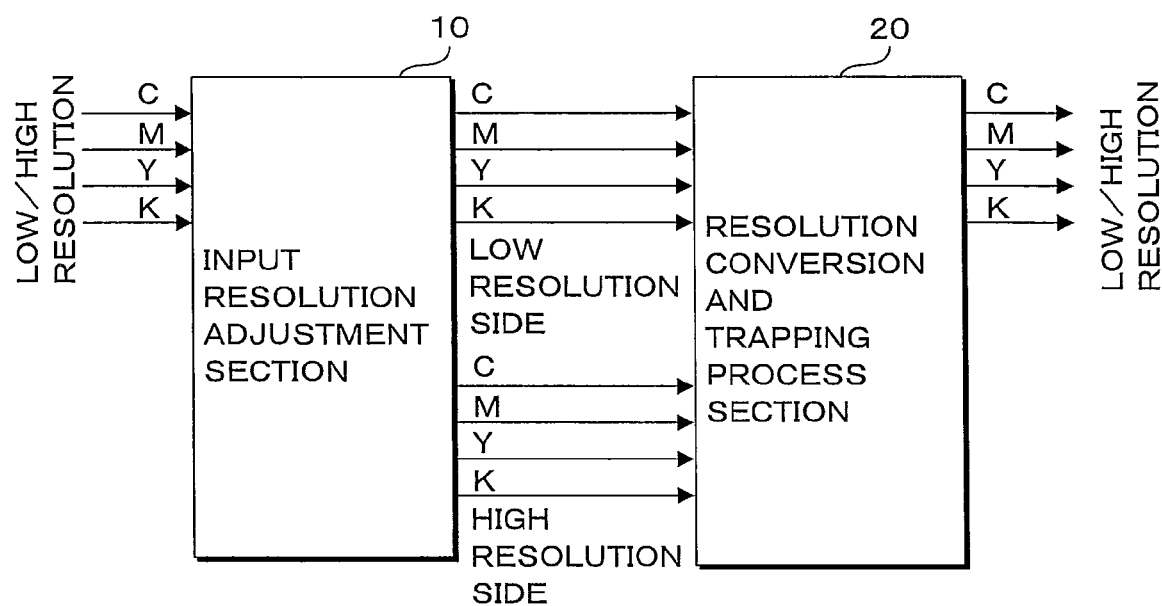
FIG. 2 is a block diagram illustrating a structure of a trapping/smoothing process section.

Next, the trapping/smoothing process section 15 will be described. FIG. 2 is a block diagram illustrating a structure of the trapping/smoothing process section 15. The trapping/smoothing process section 15 includes an input resolution adjustment section 10 and a resolution conversion and trapping process section 20.

To the input resolution adjustment section 10, the low-resolution or high-resolution CMYK signals (input image data) are inputted from the selector 14, and the input resolution adjustment section 10 generates low-resolution image data for the process in the following stage according to the need. Low resolution mentioned herein denotes, e.g., the resolution of 600 dpi or less, while high resolution mentioned herein denotes, e.g., the resolution of 600 dpi or more. It is to be noted that, although 600 dpi is adopted as a reference resolution, the value is determined depending on a capacity of a line buffer or the number of line buffers provided in the resolution conversion and trapping process section 20. In addition, when the present invention is implemented using software, it is possible to determine the value in accordance with a memory size (similarly to hardware, a required size is determined depending on the resolution to be processed) used in the resolution conversion and trapping process section 20.

Figure 3:
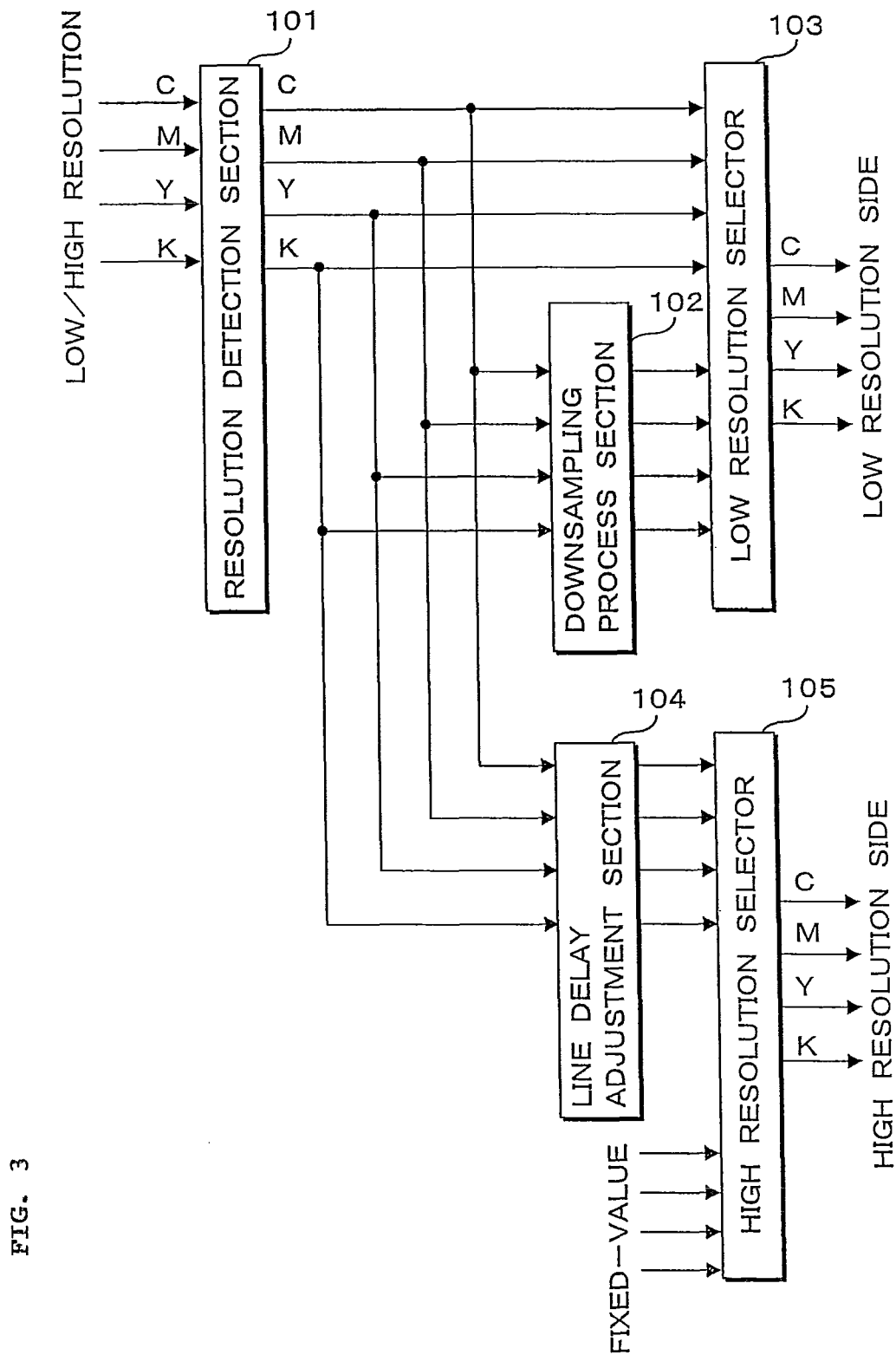
FIG. 3 is a block diagram illustrating a structure of an input resolution adjustment section.

FIG. 3 is a block diagram illustrating a structure of the input resolution adjustment section 10. The input resolution adjustment section 10 includes a resolution detection section 101, a downsampling process section (first conversion section) 102, a low resolution selector 103, a line delay adjustment section 104, and a high resolution selector (second resolution judgment section) 105, and the like. The resolution detection section 101 (first resolution judgment section) detects the resolution of the input image data based on the inputted CMYK signals, and judges whether the input image data has high resolution or low resolution by using a predetermined value, e.g., 600 dpi as the reference value. It is to be noted that the resolution of the input image data may be detected based on the resolution information inputted from the raster data generation section 11.

The downsampling process section 102 performs downsampling for converting the resolution of the input image data to low resolution when the input image data has high resolution. As a method for the downsampling, a decimation process (downsampling) or other process is employed. As the decimation process, there is employed a nearest neighbor method in which, for example, the upper left pixel is selected on a 2×2 pixel block basis for a 50% reduction. Instead of the nearest neighbor method, there may also be employed a method in which an average value in an area in accordance with a scaling factor is selected (for example, an average value of the 2×2 pixel block for a 50% reduction), a bilinear method, or a bicubic method.

The low resolution selector 103 outputs either one of the CMYK signals inputted from the resolution detection section 101 and the downsampling process section 102 in accordance with the resolution of the input image data. When the input image data has low resolution, the low resolution selector 103 outputs the CMYK signals inputted from the resolution detection section 101. On the other hand, when the input image data has high resolution, the low resolution selector 103 outputs the CMYK signals of which the resolution is converted to low resolution in the downsampling process section 102.

The line delay adjustment section 104 adjusts the timing of the two signals to be processed in the resolution conversion and trapping process section 20 in the following stage when the input image data has high resolution. Specifically, when the input image data has high resolution, the resolution conversion and trapping process section 20 performs the process with respect to the two signals of the CMYK signals subjected to the downsampling process by the downsampling process section 102, and the original high-resolution CMYK signals. Then, the trapping judgment process is performed with respect to the low-resolution CMYK signals so that a time delay occurs between the two signals by a time period required for the execution of the judgment process. Accordingly, the line delay adjustment section 104 performs a timing adjustment on a line basis between the two signals. As the structure for the timing adjustment, there may be adopted the structure composed of the line buffer, or the structure in which the signals are once outputted to the memory through DMA (Direct Memory Access), and are re-inputted at an appropriate timing through the DMA.

To the high resolution selector 105, the CMYK signals from the line delay adjustment section 104 and a signal of a fixed-value (e.g., 0) are inputted, and the high resolution selector 105 outputs either one of the signals in accordance with the resolution of the input image data or the output image. The high resolution selector 105 judges whether the output image has high resolution or low resolution by using a predetermined value such as, e.g., 600 dpi as the reference value. When the input image data or the output image has low resolution, the high resolution selector 105 outputs the signal of the fixed-value. On the other hand, when the input image data and the output image have high resolution, the high resolution selector 105 outputs the CMYK signals inputted from the line delay adjustment section 104. The resolution conversion and trapping process section 20 in the following stage operates so as not to use the signal from the high resolution selector 105 in the processing when the signal of the fixed-value is inputted thereto from the high resolution selector 105.

The resolution conversion and trapping process section 20 judges whether or not a trapping and superimposing process is performed with respect to each pixel of the low-resolution input image data outputted from the low resolution selector 103 (hereinafter referred to as a trap judgment), and further determines a color for the superimposition when the superimposition process is performed (hereinafter referred to as a trap color). In addition, the resolution conversion and trapping process section 20 performs the smoothing process with respect to the low-resolution input image data. Then, the resolution conversion and trapping process section 20 performs the trapping process based on the results of the processes.

Figure 4:
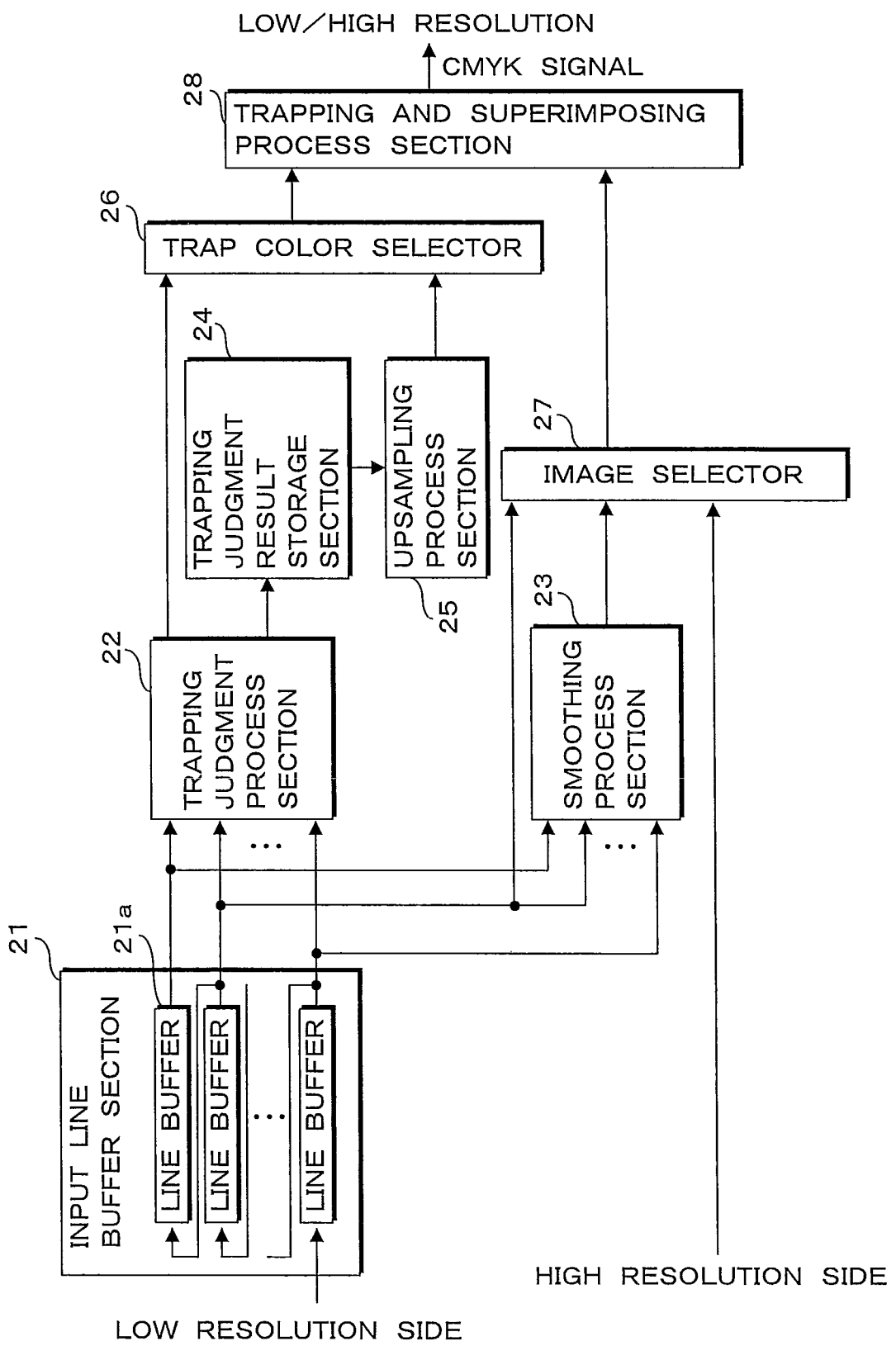
FIG. 4 is a block diagram illustrating a structure of a resolution conversion and trapping process section.

FIG. 4 is a block diagram illustrating a structure of the resolution conversion and trapping process section 20. The resolution conversion and trapping process section 20 includes an input line buffer section 21, a trapping judgment process section (process judgment section, determination section) 22, a smoothing process section (third conversion section) 23, a trapping judgment result storage section 24, an upsampling process section (second conversion section) 25, a trap color selector 26, an image selector 27, and a trapping and superimposing process section (superimposing section) 28, and the like. It is to be noted that, although only one input signal line and one output signal line are drawn in FIG. 4, it is assumed that there are actually the signal lines for four color components of CMYK, respectively.

The input line buffer section 21 has a plurality of line buffers 21a for temporarily storing the low-resolution input image data outputted from the low resolution selector 103. With the plurality of line buffers 21a, the trapping judgment process section 22 and the smoothing process section 23 in the following stage are capable of referring to data of a plurality of lines when a masking process or the like is performed.

Figure 5:
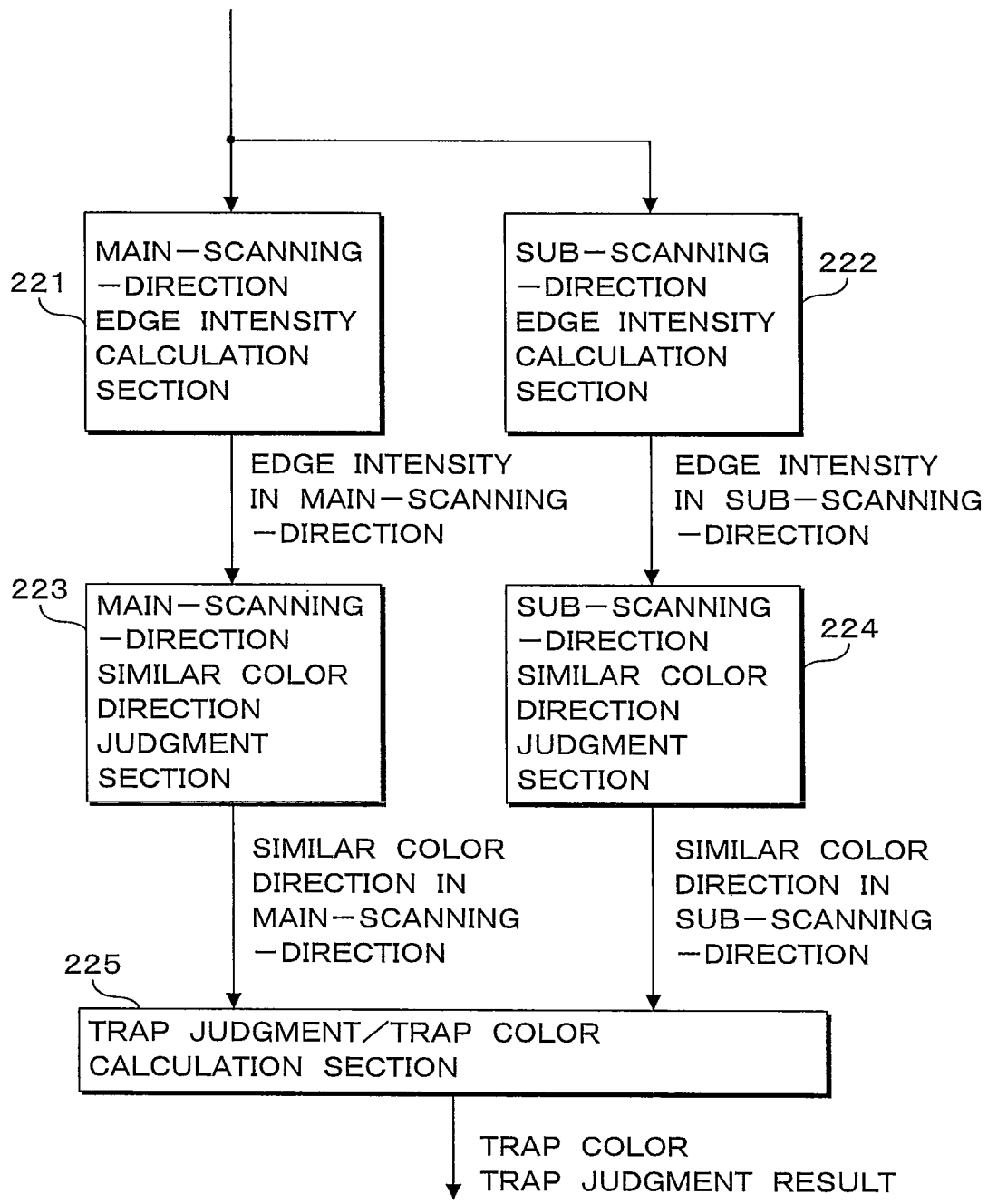
FIG. 5 is a block diagram illustrating a structure of a trapping judgment process section.
Figure 6:
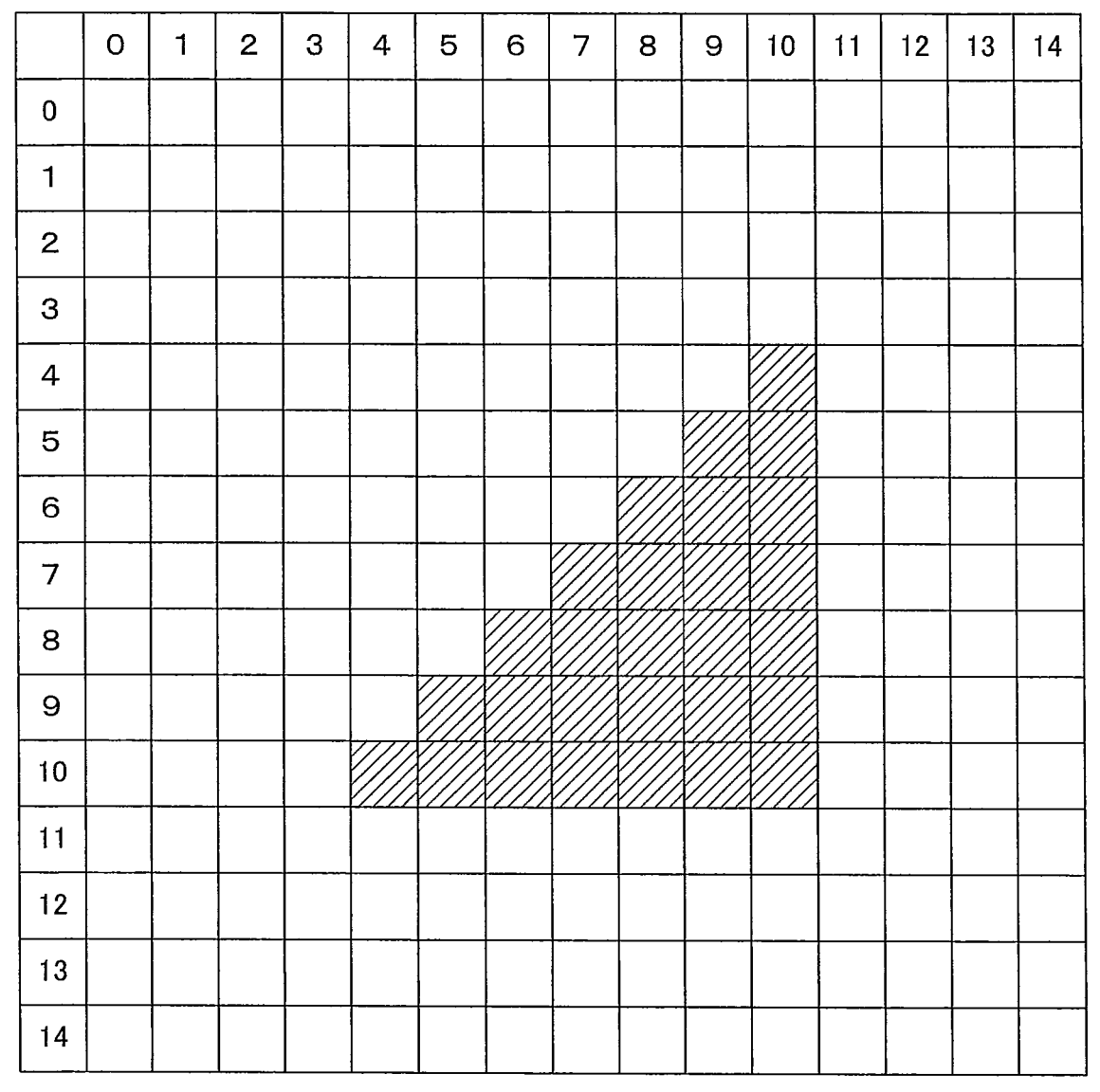

The trapping judgment process section 22 performs the trap judgment with respect to the low-resolution input image data, and further determines the trap color. FIG. 5 is a block diagram illustrating a structure of the trapping judgment process section 22. In addition, FIG. 6 is a view schematically illustrating an example of the input image data. Hereinbelow, a description will be given on the assumption that the processing is performed with respect to the input image data of 15×15 pixel block illustrated in FIG. 6. In FIG. 6, the horizontal direction indicates a main scanning direction of the image data, while the vertical direction indicates a sub-scanning direction thereof, and pixels in a hatched part indicate a pure color of cyan (C), while pixels in an open part indicate a pure color of magenta (M). Accordingly, a pixel value (M, C) of a pixel containing only magenta (M) (e.g., a pixel at 1 in the main scanning direction, and 1 in the sub-scanning direction) is (255, 0). The pixel value (M, C) of the pixel containing only cyan (C) (e.g., a pixel at 8 in the main scanning direction, and 8 in the sub-scanning direction) is (0, 255). It is to be noted that there are assumed to be no other color components (Y and K), and a description will be given hereinbelow of only cyan (C) and magenta (M).

As illustrated in FIG. 5, the trapping judgment process section 22 includes main-scanning-direction and sub-scanning-direction edge intensity calculation sections 221 and 222 (extraction section), main-scanning-direction and sub-scanning-direction similar color direction judgment sections 223 and 224, and a trap judgment/trap color calculation section (process judgment section, determination section) 225, and the like.

The main-scanning-direction and sub-scanning-direction edge intensity calculation sections 221 and 222 calculate (extract) an edge intensity in each of the main scanning direction and the sub-scanning direction for each plane (each color component) of the input image data by using differential filters. FIGS. 7A and 7B are views schematically illustrating examples of the differential filters, FIG. 7A illustrates the differential filter used for the main scanning direction, and FIG. 7B illustrates the differential filter used for the sub-scanning direction. It is to be noted that, although each of FIGS. 7A and 7B illustrates a mask size of 5×5, the mask size is not limited thereto. A trap width indicates how far from the color boundary of a press (hereinafter referred to as the trapping boundary) trapping is to be performed, and depends on the mask size. Consequently, the differential filter is capable of selecting the optimum mask size according to the need. Typically, when the trap width is large, an area where colors are superimposed on each other is increased, and the area becomes conspicuous as a false color, resulting in poor image quality. On the other hand, when the trap width is small, the white gap disadvantageously becomes conspicuous if a large misregistration occurs. Accordingly, it is possible to determine the optimum trap width and the mask size in consideration of the balance between the degree of the misregistration and the deterioration of the image quality due to the false color.

FIG. 8 is a view illustrating a part of the result of calculation of the edge intensities with respect to the input image data of FIG. 6 by using the differential filters of FIGS. 7A and 7B. In FIG. 8, values shown on the left side in each pixel indicate the edge intensities calculated with respect to cyan (C), and the value on the upper side indicates the edge intensity in the main scanning direction, while the value on the lower side indicates the edge intensity in the sub-scanning direction. In addition, values shown on the right side in each pixel indicate the edge intensities calculated with respect to magenta (M), and the value on the upper side indicates the edge intensity in the main scanning direction, while the value on the lower side indicates the edge intensity in the sub-scanning direction. For example, in the case of a pixel at 8 in the main scanning direction, and 8 in the sub-scanning direction, the edge intensity of cyan (C) is "765" in each of the main scanning and sub-scanning directions, and the edge intensity of magenta (M) is "−765" in the both directions. Further, though omitted in FIG. 8, at a pixel away from the edge (e.g., a pixel at 1 in the main scanning direction and 1 in the sub-scanning direction), the edge intensity is "0" in each of the main scanning and sub-scanning directions. Thus, in the vicinity of a boundary (edge) between cyan (C) and magenta (M) in the input image data, the edge intensity has values other than 0.

The main-scanning-direction and sub-scanning-direction similar color direction judgment sections 223 and 224 judge similar color directions in the main scanning direction and the sub-scanning direction with regard to the edge intensities calculated by the main-scanning-direction and sub-scanning-direction edge intensity calculation sections 221 and 222. The similar color direction mentioned herein means a direction in which there is a pixel of a color similar to that of a current pixel. First, the main-scanning-direction and sub-scanning-direction similar color direction judgment sections 223 and 224 judge that there is an edge in the pixel which has at least two planes out of CMYK (C and M color components in the present embodiment) each having a negative or positive edge intensity with its absolute value of not less than a threshold value (e.g., 240). It is to be noted that the threshold value may be changed appropriately depending on to what extent the edge is detected. In the case of a pixel at 4 in the main scanning direction, and 6 in the sub-scanning direction in FIG. 8, since the edge intensity of cyan (C) is 255, and the edge intensity of magenta (M) is −255 both in the main scanning direction, it is judged that there is an edge in the pixel. When it is judged that there is the edge, the main-scanning-direction and sub-scanning-direction similar color direction judgment sections 223 and 224 calculate a color difference (col_diff) based on an average value of the pixel values of the pixel (current pixel) in which it is judged that there is the edge and the pixels in an increment direction area and a decrement direction area.

Figure 9A:
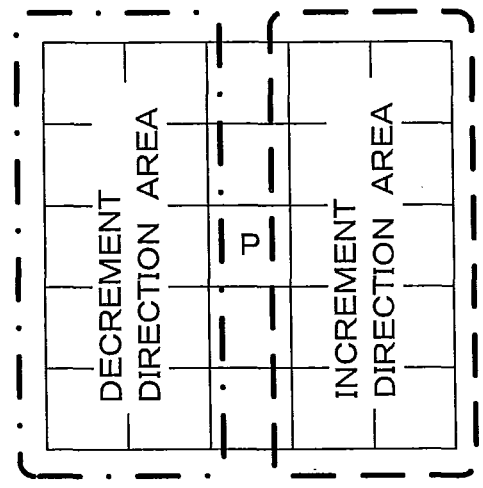
FIG. 9A is a schematic view for explaining an increment direction area and a decrement direction area in the case of the main scanning direction.
Figure 9B:
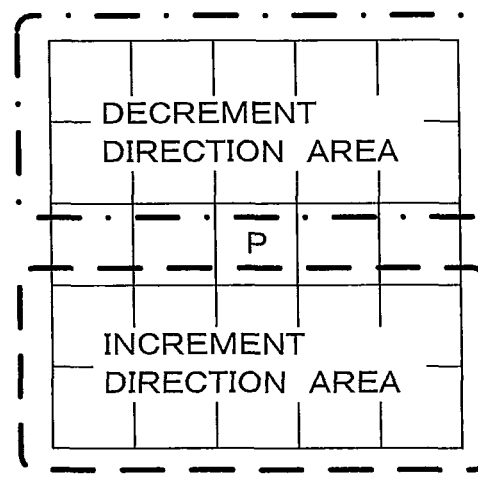
FIG. 9B is a schematic view for explaining the increment direction area and the decrement direction area in the case of the sub-scanning direction.

FIGS. 9A and 9B are schematic views for explaining the increment direction area and the decrement direction area, FIG. 9A illustrates the case of the main scanning direction, and FIG. 9B illustrates the case of the sub-scanning direction. In the main scanning direction, the left side of a current pixel P in the center corresponds to the decrement direction area, while the right side thereof corresponds to the increment direction area. In the case of the sub-scanning direction, the upper side of the current pixel P in the center corresponds to the decrement direction area, while the lower side thereof corresponds to the increment direction area. When the average values of the respective pixel values of cyan (C), magenta (M), yellow (Y), and black (K) of the current pixel are assumed to be C1, M1, Y1, and K1, and the average values of the pixel values in the increment direction area or the decrement direction area are assumed to be C2, M2, Y2, and K2, the above-described color difference (col_diff) is calculated by the following expression (2):

$$Col\_diff = |C_1 - C_2| + |M_1 - M_2| + |Y_1 - Y_2| + |K_1 - K_2| \qquad (2).$$

As the result of calculation of the color difference (col_diff) using the expression (2), the main-scanning-direction and sub-scanning-direction similar color direction judgment sections 223 and 224 judge that the direction with a smaller color difference is the similar color direction. For example, when the color difference calculated based on the current pixel and the increment direction area is smaller than the color difference calculated based on the current pixel and the decrement direction area, the increment direction is judged to be the similar color direction. It is to be noted that, when the main-scanning-direction and sub-scanning-direction similar color direction judgment sections 223 and 224 judge that there is not an edge, they judge that there is no similar color direction. Hereinbelow, when the increment direction is judged to be the similar color direction, the main-scanning-direction and sub-scanning-direction similar color direction judgment sections 223 and 224 output a judgment result "1", while when the decrement direction is judged to be the similar color direction, the main-scanning-direction and sub-scanning-direction similar color direction judgment sections 223 and 224 output "−1". Further, when it is judged that there is no similar color direction, the main-scanning-direction and sub-scanning-direction similar color direction judgment sections 223 and 224 output "0".

Figure 10:
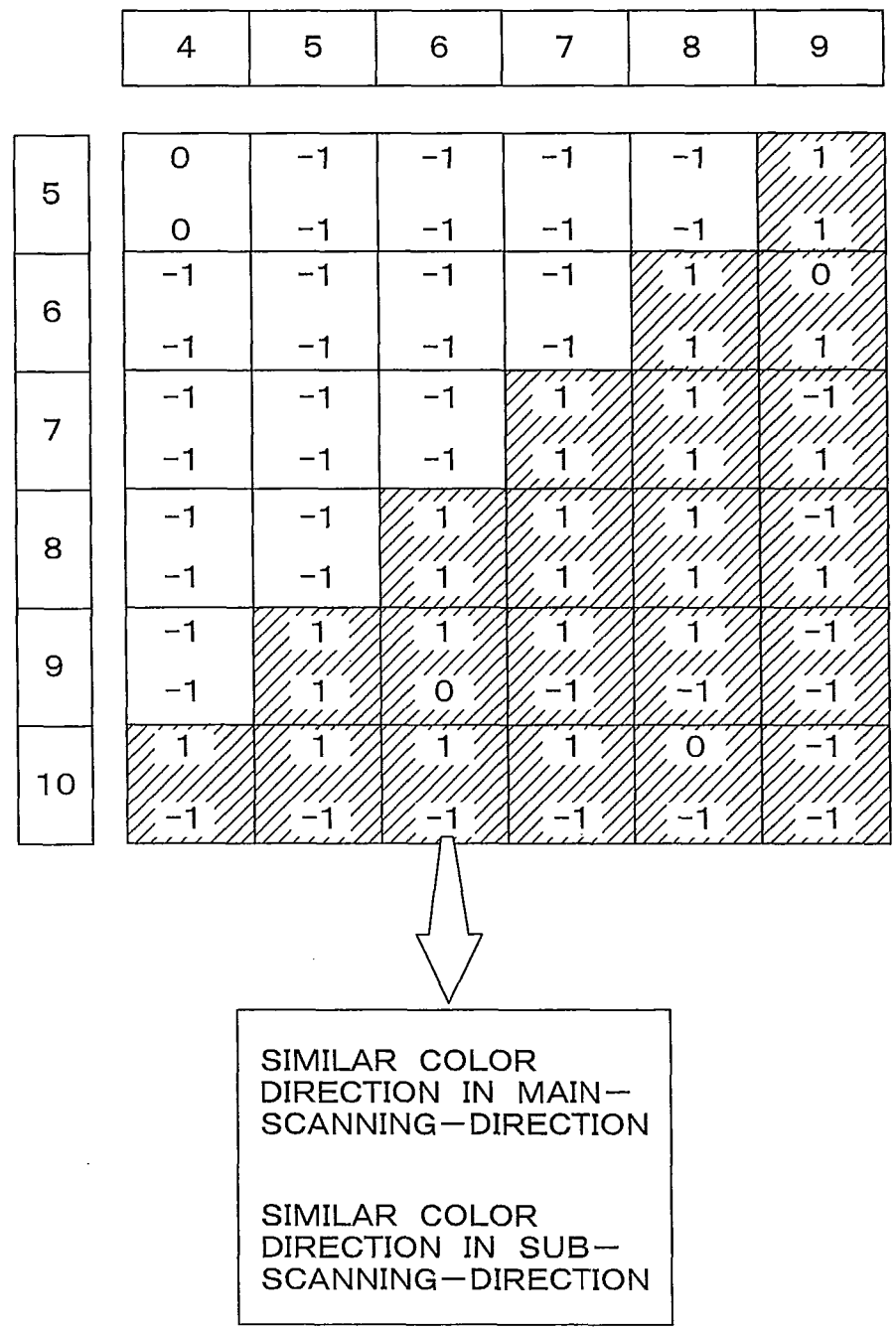
FIG. 10 is a view illustrating a part of a result of performing a similar color direction judgment with respect to the input image data of FIG. 6.

FIG. 10 is a view illustrating a part of the result of performing the similar color direction judgment with respect to the input image data of FIG. 6. The values in each pixel indicate the result of judgment of the similar color direction, and the value on the upper side indicates the main scanning direction, while the value on the lower side indicates the sub-scanning direction. For example, in the case of a pixel at 6 in the main scanning direction, and 7 in the sub-scanning direction, the similar color direction in each of the main scanning and sub-scanning directions is −1, i.e., the decrement direction is indicated so that the color of the current pixel is similar to that of the pixel in the decrement direction.

The trap judgment/trap color calculation section 225 performs the trap judgment and the determination of the trap color based on the results of the processes in the main-scanning-direction and sub-scanning-direction edge intensity calculation sections 221 and 222, and the main-scanning-direction and sub-scanning-direction similar color direction judgment sections 223 and 224. First, the trap judgment/trap color calculation section 225 calculates a representative color of the pixels in the mask size.

Figure 11A:
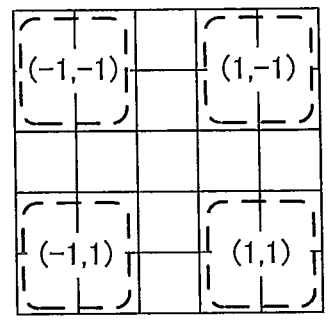
FIGS. 11A to 11C are schematic views for explaining areas to be referred to when calculating a representative color.
Figure 11B:
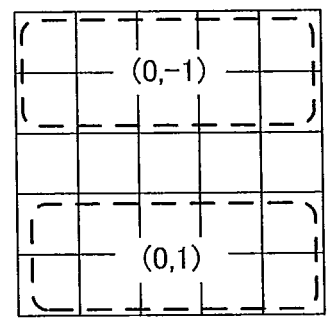
Figure 11C:
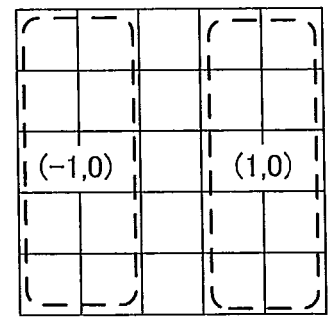
Figure 12:
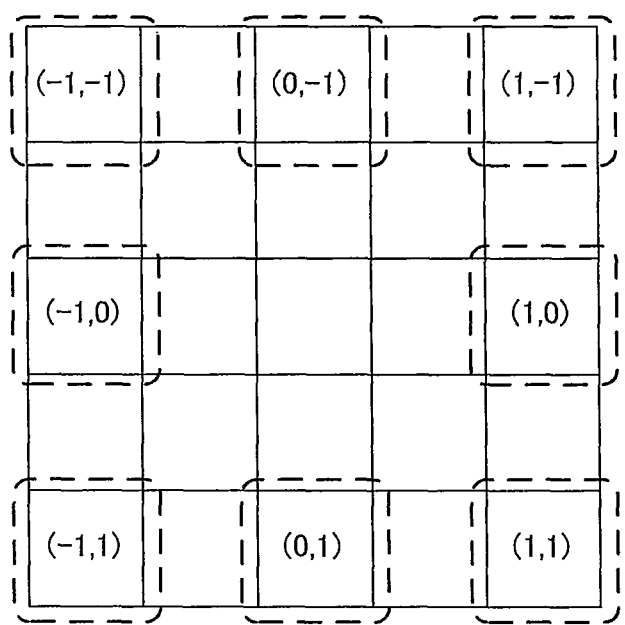
FIG. 12 is a schematic view for explaining areas to be referred to when calculating the representative color.

FIGS. 11A to 11C and 12 are schematic views for explaining areas to be referred to when the representative color is calculated. FIGS. 11A to 11C illustrate a case where the representative color is calculated based on the average value of the pixel values of a plurality of pixels, while FIG. 12 illustrates a case where the representative color is calculated based on the pixel value of one pixel. In the description shown below, a method for calculating the representative color by using the areas illustrated in FIGS. 11A to 11C is referred to as an area type, while a method of FIG. 12 is referred to as a point type.

The trap judgment/trap color calculation section 225 calculates the representative colors on the current side and the opposite side for each color component based on the result of the judgment by the main-scanning-direction and sub-scanning-direction similar color direction judgment sections 223 and 224. For example, in the pixel at 6 in the main scanning direction, and 7 in the sub-scanning direction, the similar color direction in each of the main scanning direction and the sub-scanning direction is "−1". When the representative colors are calculated based on the area type, the representative color on the current side corresponds to the average value of the pixel values in the area (−1, −1) illustrated in FIG. 11A. At this time, the representative color on the opposite side corresponds to the average value of the pixel values in the area (1, 1). When the representative colors are calculated based on the point type, the representative color on the current side corresponds to the pixel value of (−1, −1) illustrated in FIG. 12, while the representative color on the opposite side corresponds to the pixel value of (1, 1).

It is to be noted that the trap judgment/trap color calculation section 225 may calculate the representative colors based on either the area type or the point type. When the trap judgment/trap color calculation section 225 calculates the trap color based on the area type, it is possible to make the trapping portion (superimposed portion) inconspicuous. On the other hand, when the trap judgment/trap color calculation section 225 calculates the trap color based on the point type, since the color does not become light, the trapping portion become likely to be conspicuous, but it is possible to reduce the degree of visual recognition of the white gap if the misregistration occurs. Thus, the trap judgment/trap color calculation section 225 may be adapted to calculate the representative colors by switching between the area type and the point-type in accordance with whether the priority is given to the problem of the image quality degradation due to the false color when the small misregistration occurs, or the problem of the image quality degradation due to the white gap when the large misregistration occurs. Hereinbelow, a description will be given on the assumption that the representative colors are calculated based on the area type.

FIG. 13 is a view illustrating a part of the result of calculation of the representative colors on the current side and the opposite side. The values in each pixel indicate the pixel values of the calculated representative colors, and the values shown on the right side in each pixel indicate the pixel values of the representative colors calculated with respect to magenta (M), while the values on the left side indicate the pixel values of the representative colors calculated with respect to cyan (C). In addition, the values on the upper side indicate the pixel values of the representative colors on the current side, while the values on the lower side indicate the pixel values of the representative colors on the opposite side. For example, in the case of the pixel at 6 in the main scanning direction, and 7 in the sub-scanning direction, the representative color on the current side is magenta (M), while the representative color on the opposite side is cyan (C).

The trap judgment/trap color calculation section 225 calculates the representative colors on the current side and the opposite side, and then calculates a luminance value L based on expressions (3) to (6). (C rep, M rep, Y rep, and K rep) in expressions (3) to (5) indicates the representative colors on the current side and the opposite side, and these expressions are used for converting CMYK to RGB. The expression (6) is used for calculating the luminance value L by using the converted RGB.

$$R = 255 - \text{MIN}\left(255, \frac{Crep \times (255 - Krep)}{255} + Krep\right) \quad (3)$$

$$G = 255 - \text{MIN}\left(255, \frac{Mrep \times (255 - Krep)}{255} + Krep\right) \quad (4)$$

$$B = 255 - \text{MIN}\left(255, \frac{Yrep \times (255 - Krep)}{255} + Krep\right) \quad (5)$$

$$L = 0.29891 \times R + 0.58661 \times G + 0.11448 \times B \quad (6)$$

The trap judgment/trap color calculation section 225 compares the luminance values on the current side and the opposite side with each other using the above-described expressions and, when the luminance value on the current side is lower than the luminance value on the opposite side, judges that the trap judgment is enabling in order to enlarge an area with higher luminance value (lightly colored area). By enlarging the area with higher luminance value, it is possible to prevent deformation of the shape of an object. When the trap judgment is enabling, the trap judgment/trap color calculation section 225 determines the representative color in the area on the opposite side, i.e., the representative color with higher luminance value as the trap color. On the other hand, when the luminance value on the current side is higher than that on the opposite side, the trap judgment/trap color calculation section 225 judges that the trap judgment is disabling.

FIG. 14 is a view illustrating a part of the luminance values calculated based on the representative colors on the current side and the opposite side, and the trap judgment result. The values in each pixel indicate the calculated luminance values on the current side and the opposite side, and the trap judgment result. With regard to the trap judgment result, "1" indicates a case where the trap judgment is enabling, while "0" indicates a case where the trap judgment is disabling. For example, in the case of the pixel at 6 in the main scanning direction, and 7 in the sub-scanning direction, since the luminance value on the current side is lower than that on the opposite side, the trap judgment is enabling, and the trap judgment is 1. The trap judgment/trap color calculation section 225 determines that the superimposition process is performed with respect to the pixel by using the determined trap color, i.e., cyan (C) as the trap color (see FIG. 13).

The trapping judgment process section 22 outputs the above-described process result by the trap judgment/trap color calculation section 225 to the trap color selector 26 and the trapping judgment result storage section 24.

When the input image data has low resolution, and the output image has high resolution, the smoothing process section (generation section, color difference calculation section, first change section, second change section) 23 performs the smoothing process with respect to the low-resolution input image data to generate high-resolution image data. The smoothing process section 23 generates pixel data (image data) by interpolating the data for each 2×2 unit of the input image data (CMYK signals). At this time, the smoothing process section 23 performs processing while reducing blurred pixels and jaggies.

FIG. 15 is a schematic view for explaining data interpolation in the smoothing process. It is to be noted that FIG. 15 illustrates a case where the resolution in each of the main scanning direction and the sub-scanning direction is doubled, and it is assumed that pixels P 00, P 01, P 10, and P 11 (hereinafter referred to as input pixels) are interpolated with pixels 0, 1, 2, and 3 (hereinafter referred to as output interpolation pixels).

The smoothing process section 23 executes bilinear interpolation for each plane (each color component) to generate the output interpolation pixels. In the case of FIG. 15, the smoothing process section 23 calculates the output interpolation pixel 3 by using an expression (7). It is assumed herein that the respective pixel values of C of the pixels P 00, P 01, P 10, and P 11 are (Cp 00, Cp 01, Cp 10, Cp 11), and the pixel value of the output interpolation pixel 3 is (Cb 13, Mb 13, Yb 13, Kb 13).

$$C_{b13}=C_{p00}\times(1-u)(1-v)+C_{p10}\times u(1-v)+C_{p01}\times(1-u)v+C_{p11}\times uv \tag{7}$$

Since the same applies to Mb 13, Yb 13, and Kb 13, the expressions therefor will be omitted. In addition, with regard to values of u and v in the expression (7), u=0 and v=0 are satisfied in the case of the output interpolation pixel 0, u=0.5 and v=0 are satisfied in the case of the output interpolation pixel 1, u=0 and v=0.5 are satisfied in the case of the output interpolation pixel 2, and u=0.5 and v=0.5 are satisfied in the case of the output interpolation pixel 3. Next, the color differences between the output interpolation pixels and the input pixels are calculated for the output interpolation pixels 0 to 3. Since the calculation expression therefor is the same as the expression (1), the calculation expression will be omitted. Further, when the minimum value in the calculated color differences is less than the threshold value (e.g., 140), the input pixel value is determined to be the output interpolation pixel value. When the minimum value is not less than the threshold value, the pixel value of P 10 is determined to be the pixel value of the output interpolation pixel in a case where v<0.5 is satisfied, while the pixel value of P 11 is determined to be the pixel value of the output interpolation pixel in a case where v≥0.5 is satisfied.

Figure 16A:
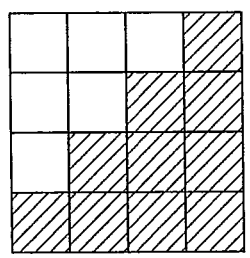
FIGS. 16A to 16D are schematic views conceptually illustrating the smoothing process.
Figure 16B:
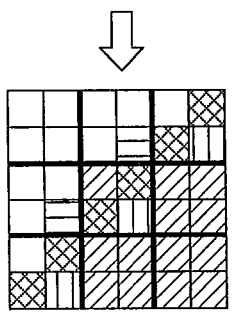
Figure 16C:
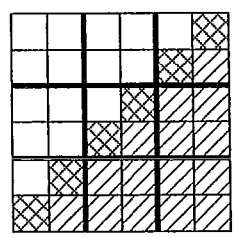
Figure 16D:
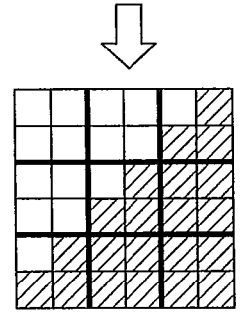

FIGS. 16A to 16D are schematic views conceptually illustrating the smoothing process. For example, when the resolution of a 4×4 pixel block including the boundary area between magenta (M) and cyan (C) of FIG. 16A is doubled as described above, four output interpolation pixels are generated from four input pixels using the bilinear interpolation (see FIG. 16B). When the calculated color difference is closer to cyan (C) or magenta (M), the pixel of the color to which the color difference is closer is copied (see FIG. 16C). When the calculated color difference is an intermediate value between cyan (C) and magenta (M), the right side of the input pixel is copied (FIG. 16D). It is possible to smooth even a sloping line into a smooth shape.

Figure 17:
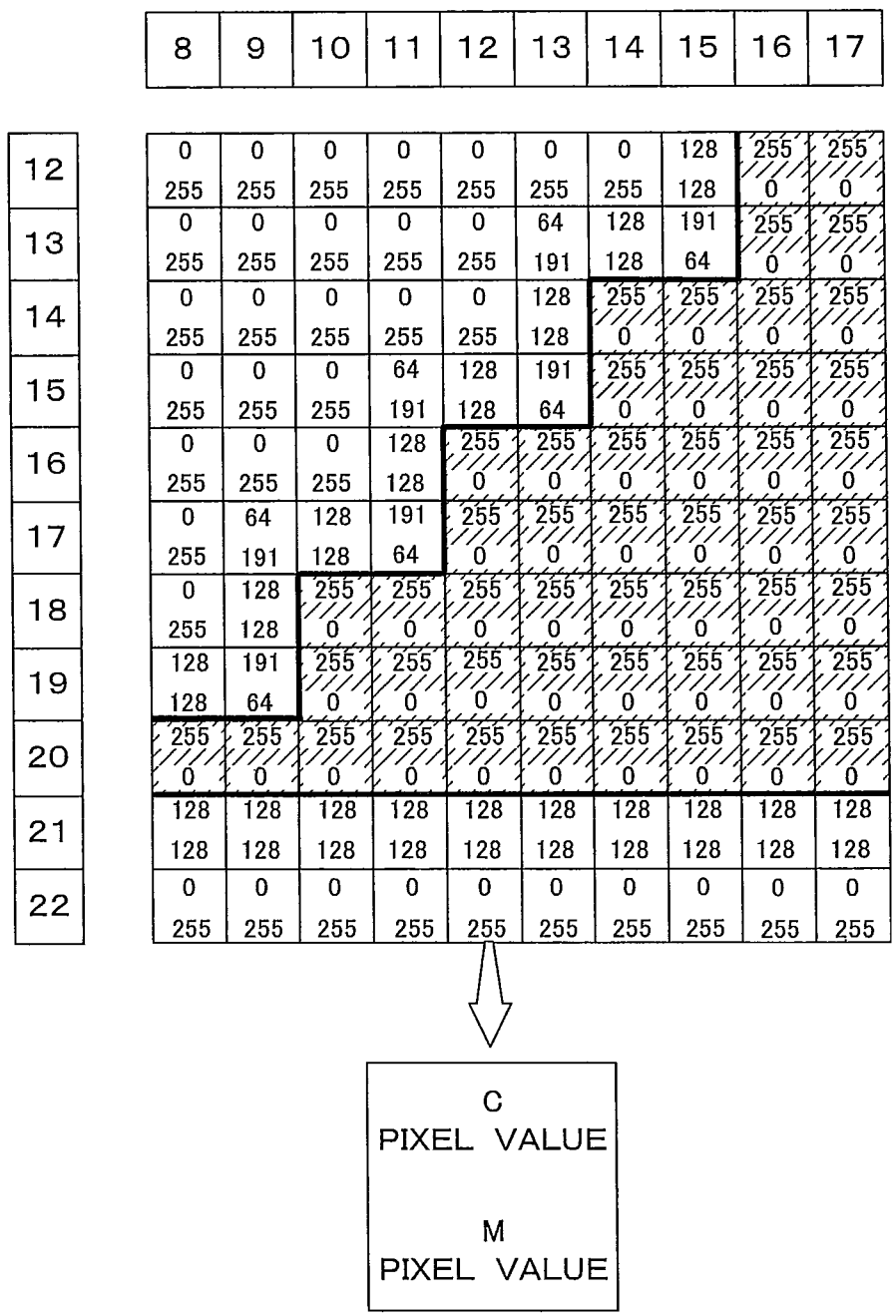
FIG. 17 is a view illustrating a result of performing bilinear interpolation with respect to the input image data of FIG. 6.
Figure 18:
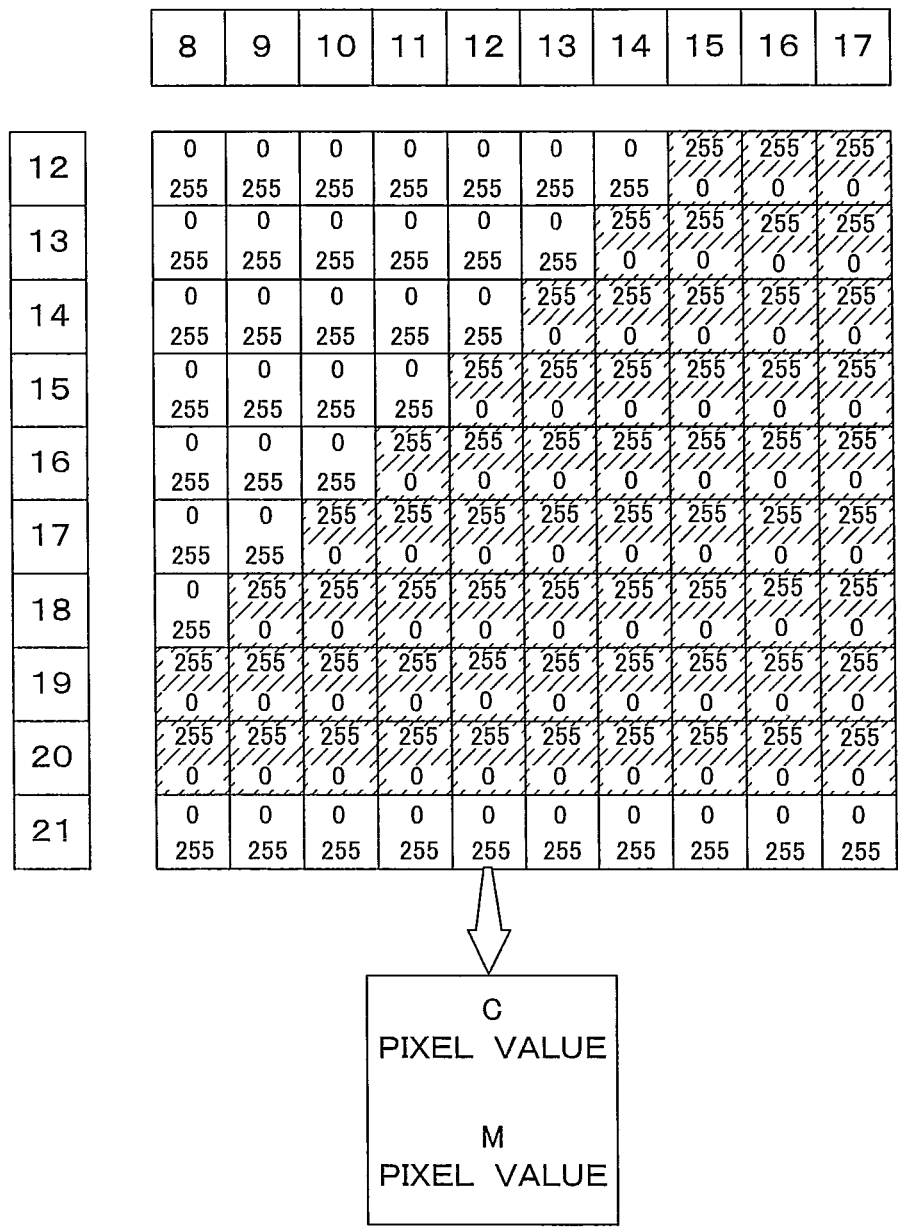
FIG. 18 is a view illustrating a part of a result of a process for copying a pixel of a color close to that of a current pixel in the image data of FIG. 17.

FIG. 17 is a view illustrating the result of performing the bilinear interpolation with respect to the input image data of FIG. 6. With regard to the values in each pixel, the value on the upper side indicates the pixel value of cyan (C), while the value on the lower side indicates the pixel value of magenta (M). It is to be noted that, since the pixel values of yellow (Y) and black (K) are 0, they are omitted in FIG. 17. For example, as indicated by the pixels at 21 in the sub-scanning direction, the pixel values are intermediate values between cyan (C) and magenta (M) in the boundary area between cyan (C) and magenta (M). FIG. 18 is a view illustrating a part of the result of the process for copying the pixel of the color close to the current pixel in the image data of FIG. 17.

The trap judgment result storage section 24 stores the trap judgment result and the trap color as the result of the process performed by the trapping judgment process section 22 when the output image has high resolution. The upsampling process section 25 reads the trap judgment result and the trap color stored in the trap judgment result storage section 24, and executes the upsampling process for converting the resolution to the resolution of the input image data, based on the read trap judgment result and the trap color. As a method for the upsampling, for example, the nearest neighbor method is employed. It is to be noted that the upsampling process section 25 executes the upsampling so as to be synchronized with the smoothing process performed by the smoothing process section 23.

Figure 19:
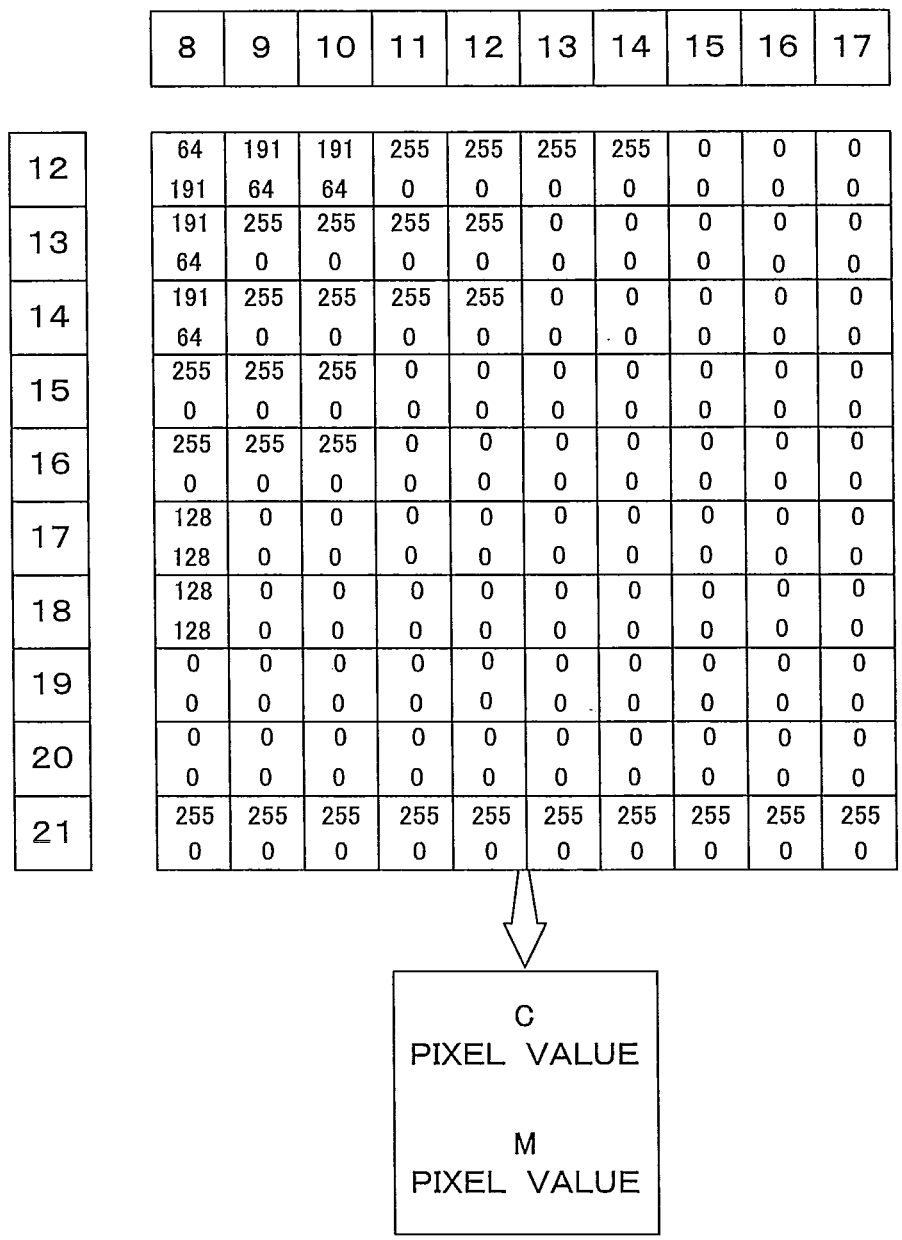
FIG. 19 is a view illustrating a part of an upsampling result.

FIG. 19 illustrates a part of the result of the upsampling performed by the up sampling process section 25. Pixels which have 0 for both of the pixel values of cyan (C) and magenta (M) indicate that the trap judgment is 0, and the other pixels indicate that the trap judgment is 1, and the trap color at that time.

The trap color selector 26 and the image selector 27 switch among their respective output signals to the trapping and superimposing process section 28 in accordance with the combination of the resolution of the input image data to the trapping/smoothing process section 15 and the resolution of the output image. To the trap color selector 26, the result of the process of the trapping judgment process section 22 and the result of the process of the upsampling process section 25 are inputted. To the image selector 27, the image data from the high resolution selector 105, the result of the process of the smoothing process section 23, and the image data from the input line buffer section 21 are inputted.

When each of the input image data and the output image has low resolution, the trap color selector 26 outputs the result of the process of the trapping judgment process section 22 to the trapping and superimposing process section 28. The image selector 27 outputs the current pixel of the input image data from the input line buffer section 21. When the input image data has low resolution, and the output image has high resolution, the trap color selector 26 outputs the result of the process of the upsampling process section 25, and the image selector 27 outputs the result of the process of the smoothing process section 23. When the input image data has high resolution, and the output image has low resolution, the trap color selector 26 outputs the result of the process of the trapping judgment process section 22, and the image selector 27 outputs the current pixel of the input image data from the input line buffer section 21. When each of the input image data and the output image has high resolution, the trap color selector 26 outputs the result of the process of the upsampling process section 25, and the image selector 27 outputs the image data from the high resolution selector 105.

Since the signal inputted to the trapping and superimposing process section 28 is different in accordance with the resolution of each of the input image data and the output image, as described above, the trapping and superimposing process section 28 performs the trapping and superimposing process based on the resolution. When each of the input image data and the output image has low resolution, the trapping and superimposing process section 28 performs the trapping and superimposing process with respect to the input image data by using the trap judgment result and the trap color outputted from the trapping judgment process section 22. When the trap judgment result is 1, the trapping and superimposing process section 28 adopts the maximum value of the input image data or the trap color as the pixel value of the output pixel for each color component. When the trap judgment result is 0, the trapping and superimposing process section 28 adopts the pixel value of the input image data as the pixel value of the output pixel. It is to be noted that, since there are cases where the superimposed pixel value becomes conspicuous when the superimposition is performed in the case of black (K), a structure may be adopted in which it is possible to choose whether the process similar to that for other color components is performed, or the superimposition process is not performed.

Figure 20:
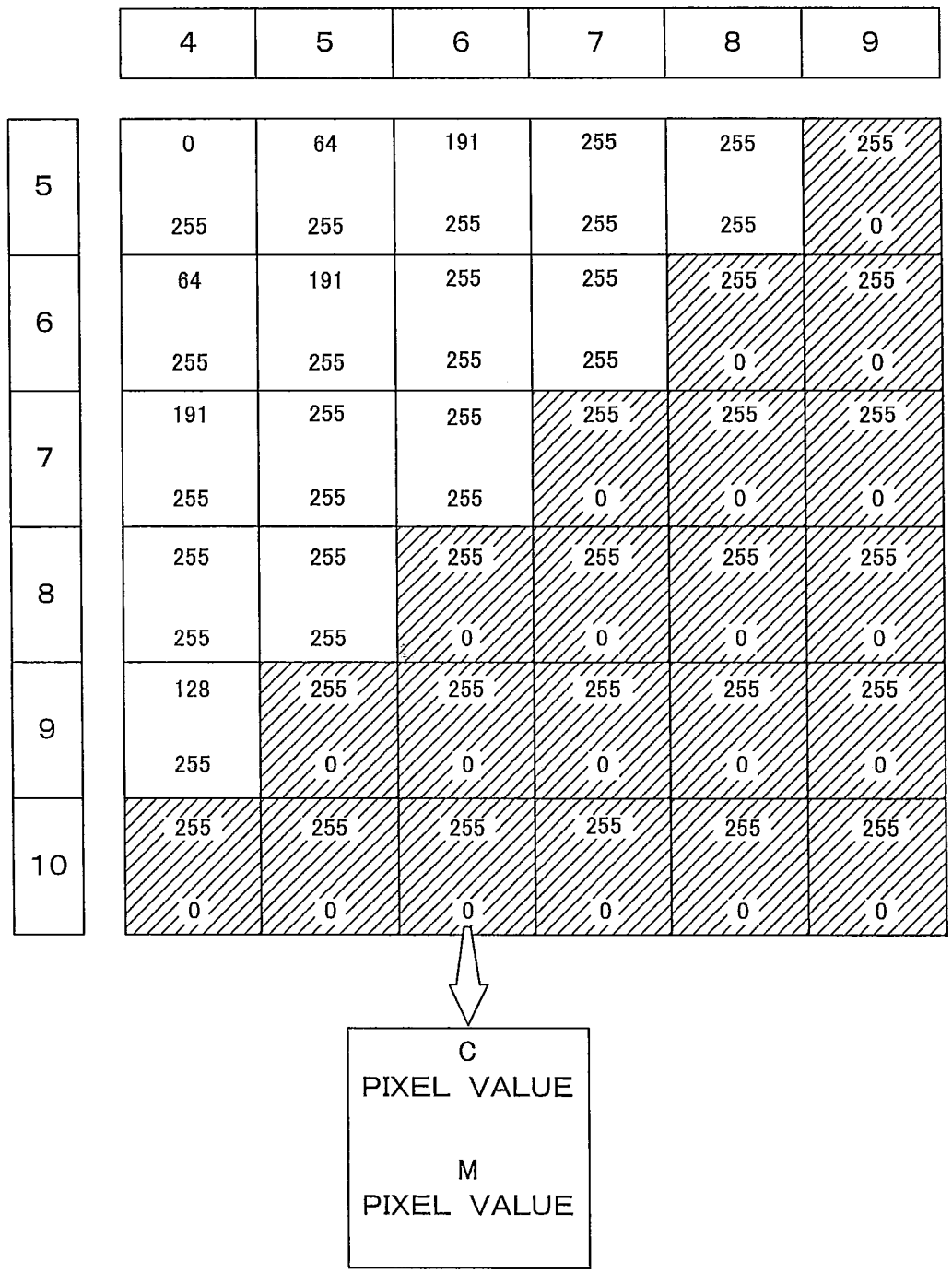
FIG. 20 is a view illustrating a part of a result of performing a trapping and superimposing process.

FIG. 20 is a view illustrating a part of the result of performing the trapping and superimposing process. In the vicinity of the boundary between cyan (C) and magenta (M), there is provided an image in which the value of cyan (C) is trapped on the side with magenta (M).

Figure 21:
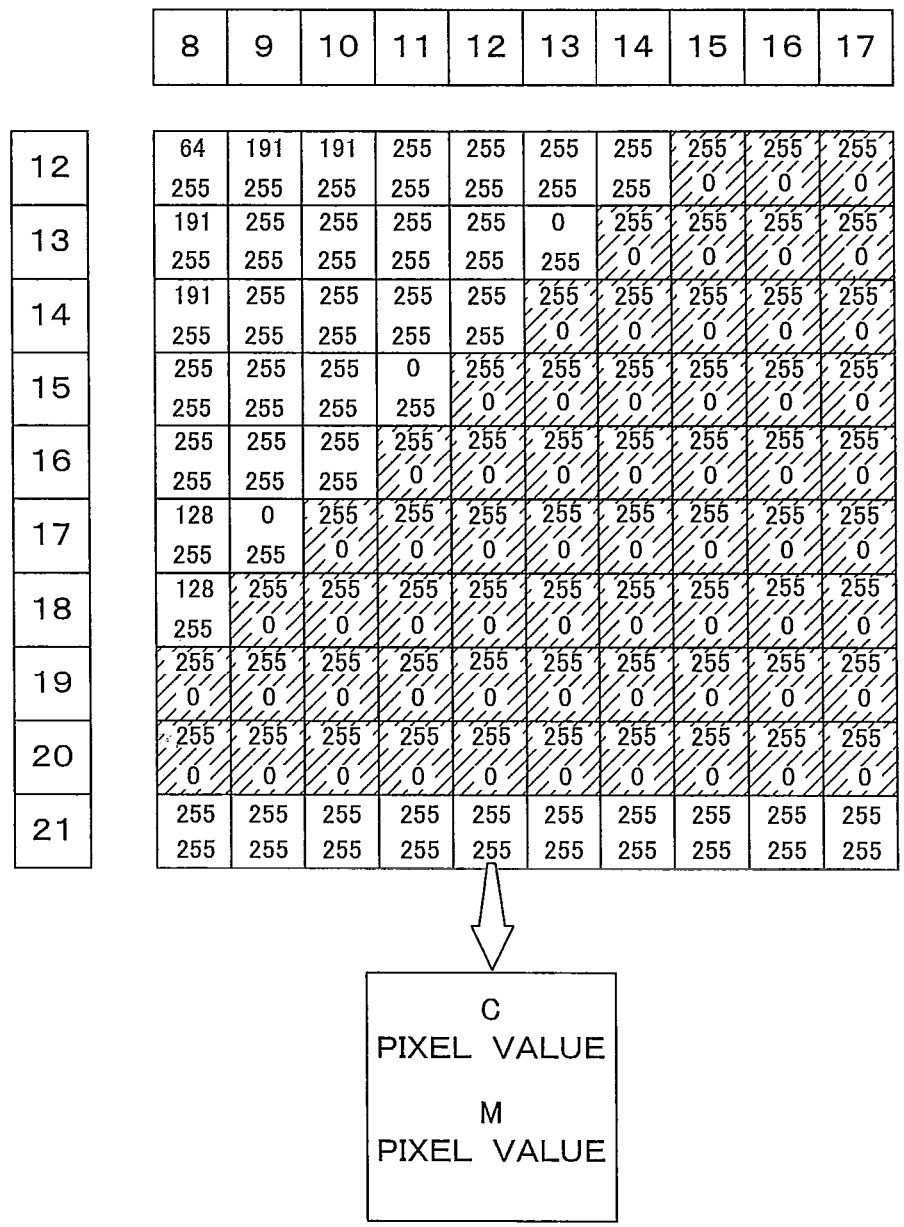
FIG. 21 is a view illustrating a part of a result of performing the trapping and superimposing process with respect to the image after the smoothing process, based on the upsampling result when the input image data has low resolution, and an output image has high resolution.

When the input image data has low resolution, and the output image has high resolution, the trapping and superimposing process section 28 performs the trapping and superimposing process to superimpose the data subjected to the upsampling process in the upsampling process section 25 on the image data subjected to the smoothing process in the smoothing process section 23. FIG. 21 is a view illustrating a part of the result of performing the trapping and superimposing process with respect to the image after the smoothing process using the upsampling result.

When the input image data has high resolution, and the output image has low resolution, the trapping and superimposing process section 28 performs the process similar to the process performed in the case where each of the input image data and the output image has low resolution. When each of the input image data and the output image has high resolution, the trapping and superimposing process section 28 performs the process for superimposing the data subjected to the upsampling process in the upsampling process section 25 on the input image data outputted from the high resolution selector 105.

By thus performing the trapping judgment process on the low resolution side, and the trapping and superimposing process on the high resolution side in the trapping process, it is possible to deal with a wide range of input resolution while reducing the image quality degradation and an increase in a circuit scale.

Figure 22:
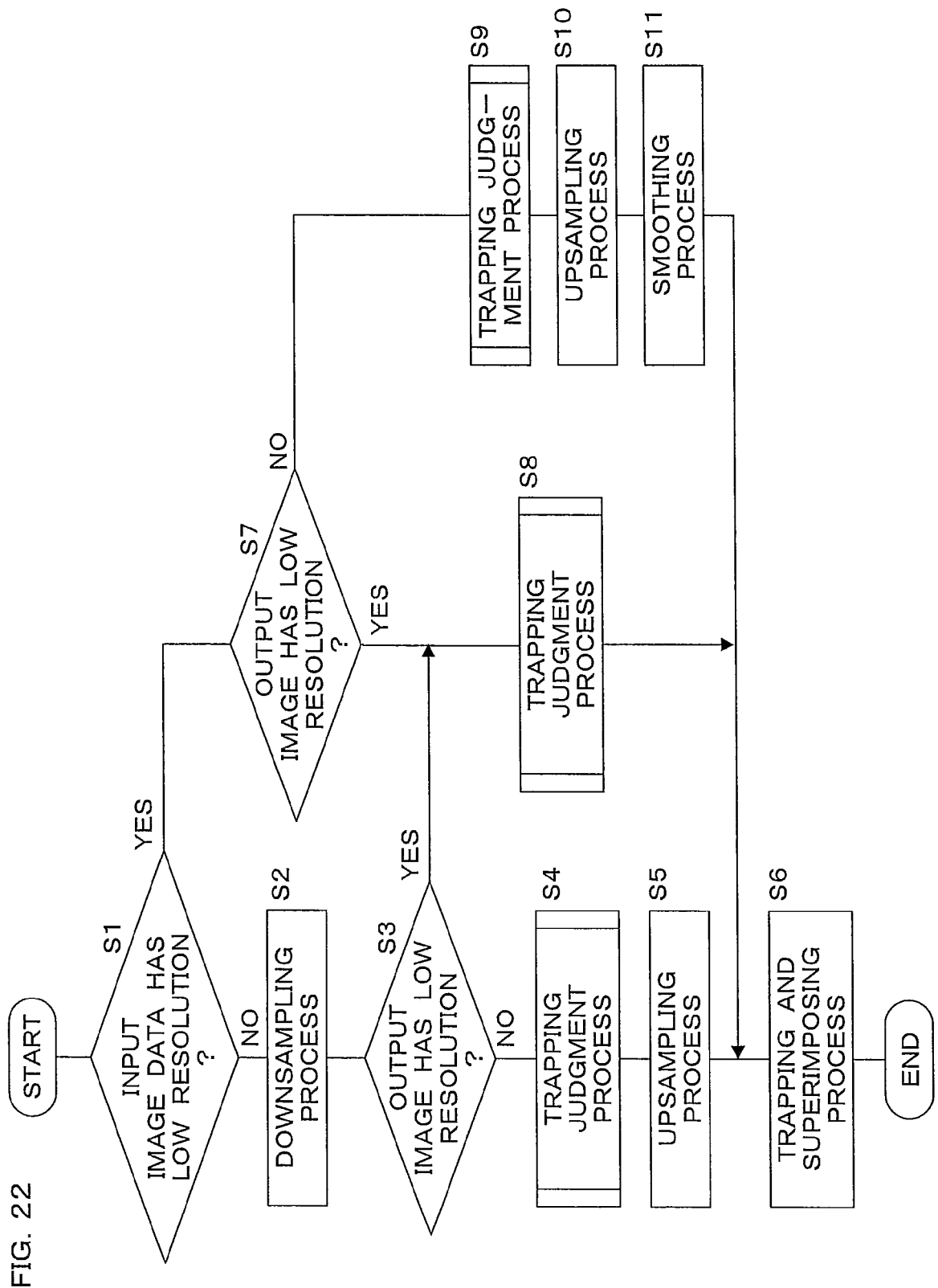
FIG. 22 is a flow chart illustrating an operation of a color image processing apparatus.

Next, a description will be given of an operation of the above-described color image processing apparatus 1. FIG. 22 is a flow chart illustrating the operation of the color image processing apparatus 1.

The color image processing apparatus 1 judges whether or not the input image data has low resolution (S1). When the input image data does not have low resolution (S1: NO), i.e., when the input image data has high resolution, the color image processing apparatus 1 performs the downsampling process with respect to the input image data (S2). As the downsampling process, the decimation process or the like is employed, as described above.

The color image processing apparatus 1 obtains the resolution selected through, e.g., the operation panel to judge whether or not the output image has low resolution (S3). When the output image does not have low resolution (S3: NO), i.e., when the output image has high resolution, the color image processing apparatus 1 performs the trapping judgment process with respect to the input image data subjected to the downsampling process in S2 (S4). The trapping judgment process is a process for performing the trap judgment and the determination of the trap color described above, and will be explained in FIG. 23 described later. Next, the color image processing apparatus 1 performs the upsampling process by using the nearest neighbor method or the like (S5). Thereafter, the color image processing apparatus 1 performs the trapping and superimposing process with respect to the input image data by using the trap judgment result and the determined trap color in S4 (S6). Subsequently, the color image processing apparatus 1 ends the present processing.

When the input image data has low resolution (S1: YES), the color image processing apparatus 1 judges whether or not the output image has low resolution similarly to S3 (S7). When the output image has low resolution (S7: YES), the color image processing apparatus 1 performs the trapping judgment process similar to that in S4 (S8). Thereafter, the color image processing apparatus 1 performs the trapping and superimposing process (S6), and then ends the present processing. In addition, when the output image has low resolution in S3 (S3: YES), the color image processing apparatus 1 executes the process in S8. Thus, when the output image has low resolution, irrespective of the resolution of the input image data, the color image processing apparatus 1 performs the process for performing the trap judgment and determining the trap color with respect to the low-resolution input image data, and performs the trapping and superimposing process based on the process result.

In S7, when the output image does not have low resolution (S7: NO), i.e., when the input image data has low resolution, and the output image has high resolution, the color image processing apparatus 1 performs the trapping judgment process similar to that in S4 (S9), and performs the upsampling process similar to that in S5 (S10). Thereafter, the color image processing apparatus 1 performs the smoothing process with respect to the low-resolution input image data, and generates the high-resolution image data (S11). It is to be noted that, in the color image processing apparatus 1, the processes in S9 and S10 and the process in S11 may be reversed in the execution order, or the processes may be performed simultaneously. Thereafter, the color image processing apparatus 1 performs the trapping and superimposing process (S6), and then ends the present processing.

Figure 23:
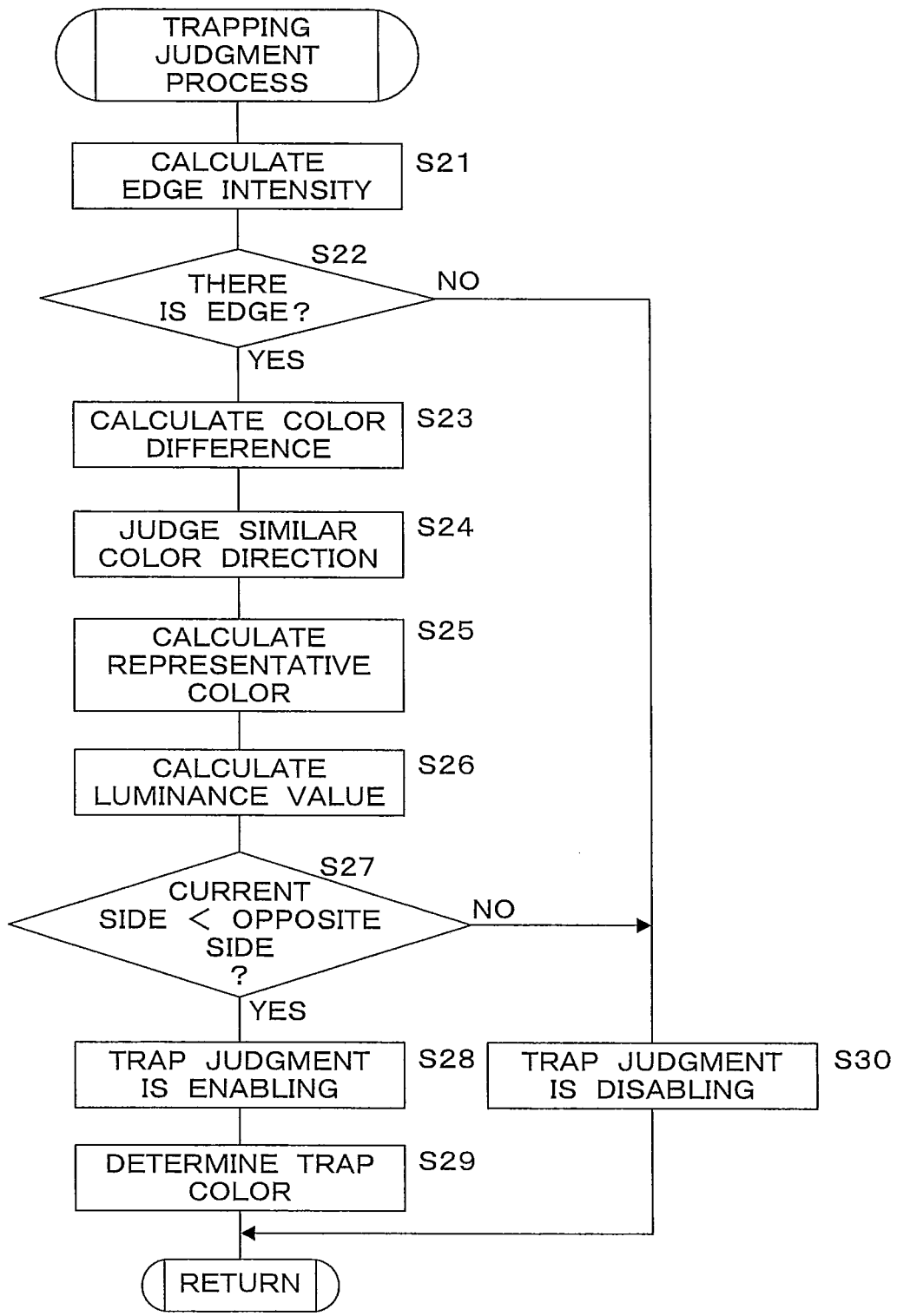
FIG. 23 is a flow chart illustrating a trapping judgment process.

FIG. 23 is a flow chart illustrating the trapping judgment process.

In the trapping judgment process, the color image processing apparatus 1 calculates the edge intensity in each of the main scanning direction and sub-scanning direction by using the differential filters illustrated in FIGS. 7A and 7B (S21). Next, the color image processing apparatus 1 judges whether or not there is an edge (S22). Based on the result of calculation of the edge intensity, the color image processing apparatus 1 judges that there is the edge in the pixel which has at least two planes out of CMYK each having a negative or positive edge intensity with its absolute value of not less than the threshold value (e.g., 240).

When it is judged that there is not the edge (S22: NO), i.e., when the absolute value of the calculated edge intensity is not more than the threshold value, or there is not the positive or negative edge, the color image processing apparatus 1 judges that the trap judgment is disabling (S30), and ends the present processing. When it is judged that there is the edge (S22: YES), the color image processing apparatus 1 calculates the color differences (col_diff) based on the average value of the pixel values of the pixel (current pixel) in which it is judged that there is the edge and the pixels in the increment direction area and decrement direction area (see FIGS. 9A and 9B) (S23). The color difference (col_diff) is calculated using the expression (2).

Next, the color image processing apparatus 1 judges the similar color direction based on the calculated color differences (col_diff) (S24). For example, when the color difference calculated based on the current pixel and the increment direction area is smaller than the color difference calculated based on the current pixel and the decrement direction area, the color image processing apparatus 1 judges that the increment direction is the similar color direction.

The color image processing apparatus 1 calculates the representative colors on the current side and the opposite side based on the judged similar color direction (S25). For example, in FIG. 10, in the case of the pixel at 6 in the main scanning direction, and 7 in the sub-scanning direction, the similar color direction is "−1" (decrement direction area) in each of the main scanning direction and the sub-scanning direction. When the representative colors are calculated based on FIGS. 11A to 11C, the representative color on the current side is the average value of the pixel values in the area (−1, −1) illustrated in FIG. 11A, while the representative color on the opposite side is the average value of the pixel values in the area (1, 1).

After calculating the representative colors on the current side and the opposite side, the color image processing apparatus 1 calculates the luminance value L based on the expressions (3) to (6) (S26). The color image processing apparatus 1 compares the calculated luminance values on the current side and on the opposite side with each other, and judges whether or not the luminance value on the current side is lower than that on the opposite side (S27). When the luminance value on the current side is lower than that on the opposite side (S27: YES), the color image processing apparatus 1 judges that the trap judgment is enabling (S28), and determines the trap color (S29). The trap color is the representative color in the area on the opposite side. Then, the color image processing apparatus 1 ends the present processing. On the other hand, when the luminance value on the current side is higher than that on the opposite side (S27: NO), the color image processing apparatus 1 judges that the trap judgment is disabling (S30), and ends the present processing.

It is to be noted that the judgment whether or not the trapping process by the trapping judgment process section 22 is performed, and the method for the trapping process are not limited to the above-described embodiment. For example, there can be considered another method in which the trap judgment is performed by using low-resolution image data, and a process for changing the pixel value is performed by using high-resolution image data, as described below.

Figure 24A:
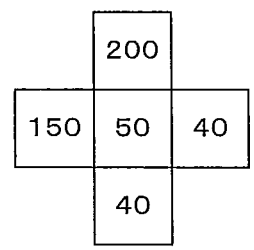
FIGS. 24A to 24D are schematic views for explaining another method for performing the trap judgment.
Figure 24B:
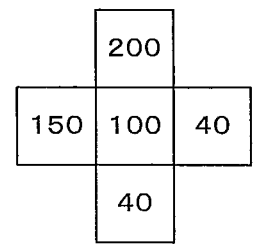
Figure 24C:
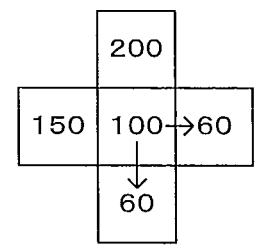
Figure 24D:
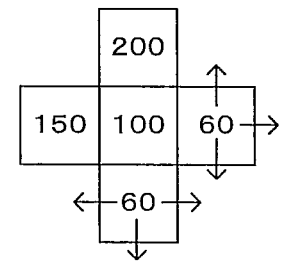

FIGS. 24A to 24D are schematic views for explaining another method for performing the trap judgment. It is judged whether or not the pixel value "50" of the current pixel is smaller than the threshold value (e.g., 70), and there is a pixel having a pixel value larger than the threshold value among pixels around the current pixel. Then, when there is a pixel satisfying the condition, it is judged that the current pixel is the edge and the trapping process is performed. In the case of FIG. 24A, when the pixel having the pixel value "50" is assumed to be the current pixel, since the pixel having the pixel value "150" on the left side and the pixel having the pixel value "200" on the upper side satisfy the condition, it is judged that the trapping process is performed.

Next, when the trapping process is performed, a pixel value of the current pixel is determined. Specifically, a smaller value between a predetermined minimum trap value (e.g., 100) and the maximum pixel value ("200" in FIGS. 24A to 24D) of pixels around the current pixel (hereinafter referred to as circumferential pixels), or a larger value (100) between the predetermined minimum trap value and a value ("200× 0.4=80" in FIGS. 24A to 24D) obtained by multiplying the maximum pixel value of the circumferential pixels by a predetermined trap rate (e.g., 0.4) is substituted for the pixel value of the current pixel (see FIG. 24B).

Next, the trapping process is performed by the following method. The trap width in which the trapping process is to be performed is controlled by the minimum trap value (100), the trap rate (0.4), and a trap width control threshold value (e.g., 10). The value (20) obtained by multiplying the difference (50) between the original pixel value (50) of the current pixel and the substituted pixel value (100) by the trap rate is added to the circumferential pixels of the current pixel (see FIG. 24C). Further, the value obtained by multiplying the added value (20) by the trap rate is added to the circumferential pixels therearound (see FIG. 24D). At this time, when the value is added to the same circumferential pixel, the maximum value among them is used. The addition process is ended at the pixel having the value resulting from the addition process which is smaller than the predetermined value (trap width control threshold value, e.g., 10). The processes may be performed for the image data of each color component, or may be performed by using the image data of a plurality of color components.

Figure 25:
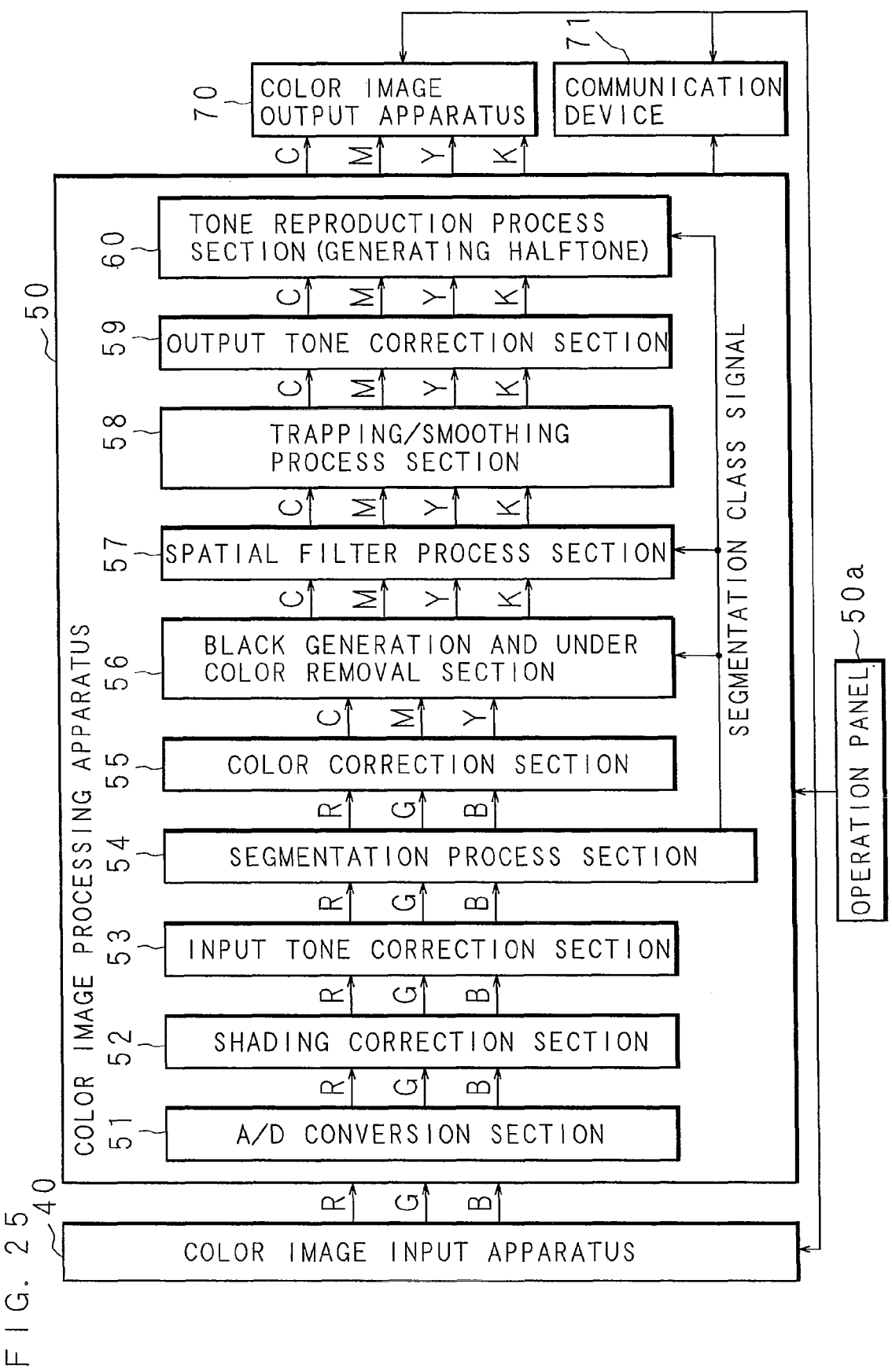
FIG. 25 is a block diagram illustrating a structure of a digital color multi-functional peripheral including the image processing apparatus according to the present invention.

In addition, in the above-described embodiment, although the description has been given of the case where the image processing apparatus according to the present invention is provided in the color image forming apparatus such as a printer or the like, the image processing apparatus according to the present invention may be provided in a color multi-functional peripheral. FIG. 25 is a block diagram illustrating a structure of a digital color multi-functional peripheral in which the image processing apparatus according to the present invention is provided.

A color image processing apparatus 50 comprises an A/D conversion section 51, a shading correction section 52, an input tone correction section 53, a segmentation process section 54, a color correction section 55, a black generation and under color removal section 56, a spatial filter process section 57, a trapping/smoothing process section 58, an output tone correction section 59, and a tone reproduction process section 60, and the like. In the digital color multi-functional peripheral, an operation panel (reception section) 50a, a color image input apparatus 40, a color image output apparatus 70, and a communication device 71 are connected to the color image processing apparatus 50. The operation panel 50a includes a setting button and a numeric keypad for setting an operational mode of the digital color multi-functional peripheral, and a display section having a liquid crystal display and the like.

The color image input apparatus 40 comprises a scanner section including, e.g., a CCD (Charge Coupled Device), and reads a reflected light image from a document as RGB (R: red•G: green•B: blue) analog signals through the CCD, and inputs the signals to the color image processing apparatus 50. The analog signals read in the color image input apparatus 40 are sent to the A/D conversion section 51, the shading correction section 52, the input tone correction section 53, the segmentation process section 54, the color correction section 55, the black generation and under color removal section 56, the spatial filter process section 57, the trapping/smoothing process section 58, the output tone correction section 59, and the tone reproduction process section 60 in this order in the color image processing apparatus 50, and are outputted to the color image output apparatus 70 as streams.

The A/D conversion section 51 converts the RGB analog signals to digital signals. The shading correction section 52 performs a process for removing various distortions occurring in a lighting system, an image focusing system, and an image sensing system in the color image input apparatus 40 with respect to the digital RGB signals sent from the A/D conversion section 51. The input tone correction section 53 performs a process for adjusting color balance and, at the same time, converting the RGB signals to signals such as density signals which are easily treated in the color image processing apparatus 50 with respect to the RGB signals (RGB reflectivity signals) inputted from the shading correction section 52.

The segmentation process section 54 segments the individual pixels in the input image into either one of a text area, a halftone area, and a photograph area using the RGB signals. Based on the segmentation result, the segmentation process section 54 outputs a segmentation class signal indicative of which area each pixel belongs to, to the black generation and under color removal section 56, the spatial filter process section 57, and the tone reproduction process section 60 and, at the same time, outputs the input signals outputted from the input tone correction section 53 directly to the color correction section 55 in the following stage. The process of the color correction section 55, the black generation and under color removal section 56, and the trapping/smoothing process section 58 are the same as those in the above-described embodiment.

The spatial filter process section 57 performs a spatial filter process using a digital filter with respect to the image data of the CMYK signals inputted from the black generation and under color removal section 56 based on the segmentation class signal, and performs a process for preventing blurring or granular degradation of the output image by correcting spatial frequency characteristics. The tone reproduction process section 60 performs a predetermined process with respect to the image data of the CMYK signals based on the segmentation class signal similarly to the spatial filter process section 57. For example, in the area segmented into the text area by the segmentation process section 54, a high frequency component thereof is enhanced (sharpened) by an edge enhancement process in the spatial filter process by the spatial filter process section 57 in order to improve reproducibility of especially a black text or a color text. At the same time, in the tone reproduction process section 60, a binarization process or a multi-level process using a high-resolution screen suitable for reproducing the high frequency component is selected.

In addition, with regard to the area segmented into the halftone area by the segmentation process section 54, a low-pass filter process for removing an input halftone component is performed in the spatial filter process section 57.

The output tone correction section 59 performs an output tone correction process based on the characteristics of the color image output apparatus 70, and the tone reproduction process section 60 then performs a tone reproduction process (halftone generation) for finally separating the image into pixels to reproduce a tone of each pixel. With regard to the area segmented into the photograph area by the segmentation process section 60, the binarization or multi-level dithering process using the screen suitable for tone reproduction is performed.

The communication device 71 includes a modem or a network card. When the communication device 71 performs facsimile transmission, after securing a transmittable state by performing a transmission procedure with a destination device using the modem, the communication device 71 reads image data compressed in a predetermined format (image data read by a scanner) from a memory, performs necessary processing such as conversion of a compression format or the like with respect to the image data, and sequentially transmits the image data to the destination device via a communication line.

When the communication device 71 performs facsimile reception, while performing a communication procedure, the communication device 71 receives the image data transmitted from an originating communication device, and inputs the received image data to the color image processing apparatus 50. In the color image processing apparatus 50, a compression/decompression process section (not shown) performs a decompression process with respect to the received image data. With respect to the decompressed image data, a rotation process and a resolution conversion process are performed according to the need, the output tone correction and tone reproduction processes are further executed, and the image data is outputted from the color image output apparatus 70.

In addition, the communication device 71 performs data communication with a computer and other digital multi-functional peripherals connected to a network via the network card and a LAN cable. Although the digital color multi-functional peripheral has been described, the multi-functional peripheral may be a monochromatic multi-functional peripheral.

Further, the present invention may embodied by recording the method for performing the trapping process and smoothing process described above in a computer-readable recording medium recording a program for causing a computer to execute. As a result, it is possible to provide a portable recording medium recording a program code for performing the processes (executable program, intermediate code program, source program).

In the above-described embodiment, since the processing is performed by a microcomputer, a memory which is not shown such as, e.g., a ROM may be a program medium as the recording medium. In addition, the recording medium may be a readable program medium by being inserted into a program reading apparatus provided as an external storage apparatus which is not shown.

In either case, a structure may be adopted in which the stored program is accessed by a microprocessor, and is executed, or, in either case, a method may be adopted in which the program code is read, the read program code is downloaded to a program storage area which is not shown in the microcomputer, and the program is executed. The program for the downloading is assumed to be stored in a main body apparatus in advance.

The program medium mentioned above is a recording medium structured as as to be detachable from the main body, and may be a medium for stationarily holding the program code which includes tape systems such as a magnetic tape and a cassette tape; disk systems such as magnetic disks inclusive of a flexible disk and a hard disk, and optical disks such as a CD-ROM, a MO, a MD, and a DVD; card systems such as an IC card (including a memory card) and an optical card; and semiconductor memories such as a mask ROM, an EPROM (Erasable Programmable Read Only Memory), an EEPROM (Electrically Erasable Programmable Read Only Memory), and a flash ROM.

In addition, in the present embodiment, since the system structure is capable of connection with communication networks inclusive of the Internet, the program medium may be a medium for flexibly holding the program code such as downloading the program code through the communication networks. It is to be noted that, when the program is downloaded through the communication networks in this manner, the program for the downloading may be stored in the main body apparatus in advance, or the program may be installed from other recording media. It is to be noted that it is possible to implement the present invention in the form of a computer data signal embedded in a carrier wave in which the program code is embodied by electronic transmission.

The recording medium is read by the digital color image forming apparatus or the program reading apparatus provided in the computer system, whereby the image processing method described above is executed.

Figure 26:
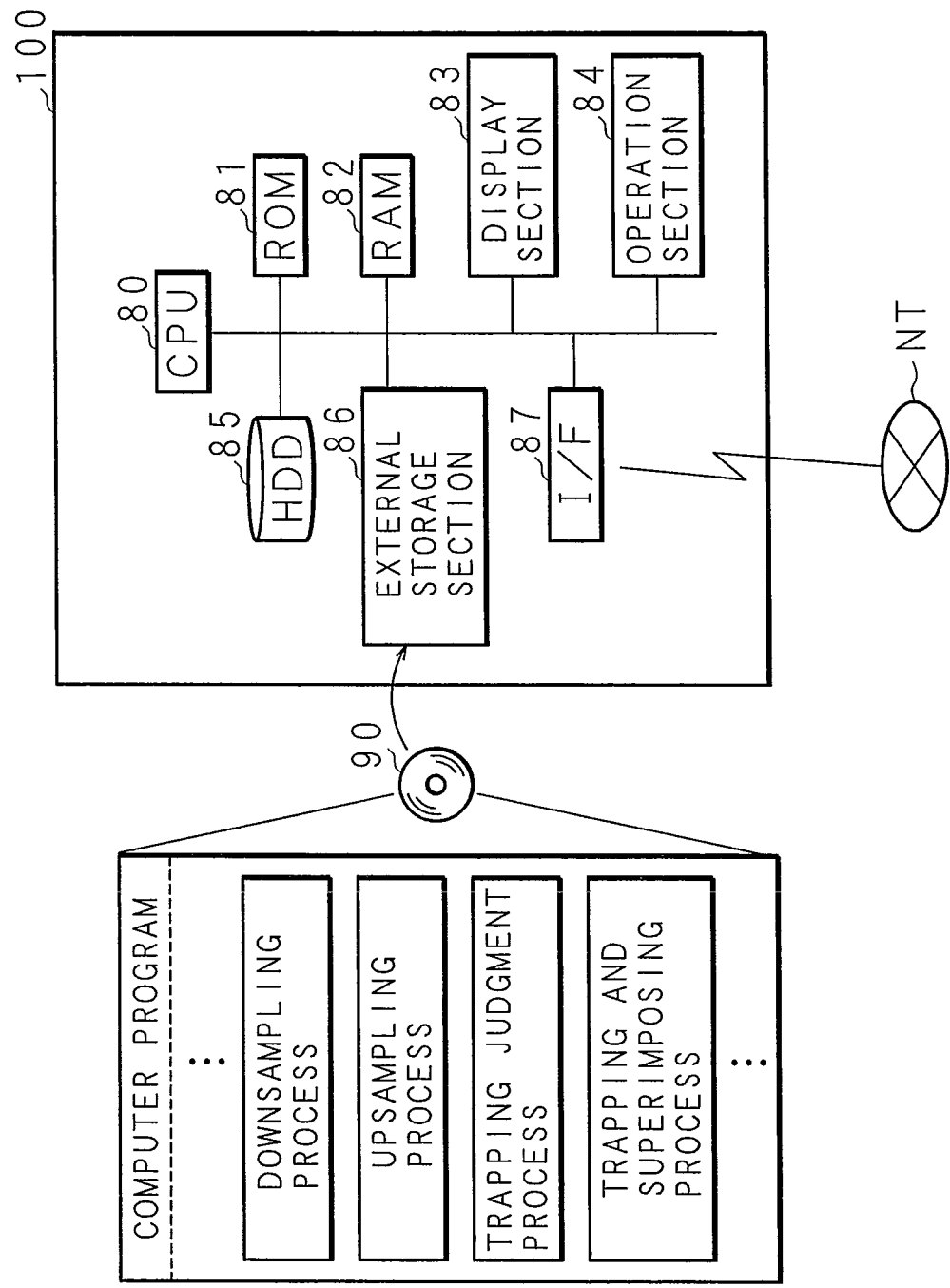
FIG. 26 is a block diagram illustrating a structure of the image processing apparatus according to the present invention.

Hereinbelow, an image processing apparatus using a personal computer will be described as an example. FIG. 26 is a block diagram illustrating a structure of the image processing apparatus according to the present invention.

The reference numeral 100 in FIG. 26 denotes the image processing apparatus, and the image processing apparatus 100 includes a CPU 80, a ROM 81, a RAM 82, a display section 83, an operation section 84 (reception section), a HDD (hard disk) 85, an external storage section 86, and an I/F (interface) 87, and these individual components are appropriately connected with each other via a bus or a signal line, or the like. The image processing apparatus 100 is connected to a network NT via the I/F 87, and communicates with other personal computers connected to the network NT.

The HDD 85 is an auxiliary storage section of the image processing apparatus 100, and various computer programs and data are written in and read from the HDD 85. The external storage section 86 includes, e.g., a CD-ROM drive, and is controlled by the CPU 80 to read the computer program and data from the recording medium having portability (e.g., the CD-ROM 90 in which the computer program of the present invention is recorded). The read computer program and data are written into the HDD 85.

The CPU 80 is a control center of the image processing apparatus 100, and controls the individual components in accordance with the computer program and data stored in the ROM 81 and/or the HDD 85 to execute various processes by using the RAM 82 which is the main storage section as a work area. More specifically, the CPU 80 of the personal computer executes image processing processes including the downsampling process, the upsampling process, and the trapping process in accordance with the computer program of the present invention, whereby the personal computer functions as the image processing apparatus 100 of the present invention.

The display section 83 includes, e.g., a liquid crystal display, and is controlled by the CPU 80 to display messages indicative of an operational state of the image processing apparatus 100 and various instructions with respect to a user. The operation section 84 includes, e.g., a keyboard and a mouse. A user of the image processing apparatus 100 inputs resolution of output image data by operating the operation section 84.

Although the specific description has been given thus far of the preferred embodiment of the present invention, the structures and operations can be appropriately changed, and are not limited to the above-described embodiment.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus which performs, when output image data is generated from input image data having a plurality of color components, a process for superimposing a pixel having the plurality of color components with respect to an edge extracted based on the input image data, comprising:

a first resolution judgment section for judging whether or not resolution of input image data is not less than a predetermined value;

a first conversion section for converting resolution of the input image data to resolution less than the predetermined value when the first resolution judgment section judges that the resolution of the input image data is not less than the predetermined value;

a process judgment section for judging whether or not the process for superimposing a pixel having a plurality of color components is performed with respect to an edge extracted based on the image data after conversion by the first conversion section;

a determination section for determining a color component of the pixel to be superimposed when the process judgment section judges that the process for superimposing is performed;

a second conversion section for converting resolution of pixel data based on the color component determined by the determination section to the resolution of the input image data; and a superimposing section for performing a process for superimposing the input image data on the pixel data after conversion by the second conversion section.

2. The image processing apparatus according to claim 1, further comprising:
- a reception section for receiving resolution of output image data;
- a second resolution judgment section for judging whether or not the resolution received by the reception section is not less than the predetermined value; and
- a third conversion section for converting resolution of the input image data to the resolution received by the reception section when the first resolution judgment section judges that the resolution is less than the predetermined value, and the second resolution judgment section judges that the resolution received by the reception section is not less than the predetermined value,
- wherein the process judgment section judges whether or not the process for superimposing is performed with respect to the input image data when the third conversion section converts the resolution of the input image data to the resolution received by the reception section,
- the second conversion section converts the resolution of the pixel data based on the color component determined by the determination section to the resolution received by the reception section, and
- the superimposing section superimposes the pixel data after conversion by the second conversion section on the image data after conversion by the third conversion section to generate the output image data.

3. The image processing apparatus according to claim 2, wherein the third conversion section:
- generates an interpolation pixel for the input image data;
- calculates a color difference between the generated interpolation pixel and a pixel of the input image data closest to the interpolation pixel;
- changes a pixel value of the interpolation pixel to a pixel value of the pixel of the input image data when the calculated color difference is less than a predetermined value; and
- changes the pixel value of the interpolation pixel to a pixel value of a pixel of the input image data situated at a predetermined position relative to the interpolation pixel when the calculated color difference is not less than the predetermined value.

4. The image processing apparatus according to claim 1, wherein the process judgment section:
- includes an extraction section for extracting an edge based on the image data after conversion by the first conversion section; and
- a direction judgment section for judging a direction in which there is a pixel of a color similar to that of a current pixel included in the image data after conversion, based on the edge extracted by the extraction section, and
- the process judgment section judges whether or not the process for superimposing is performed based on a judgment result of the direction judgment section.

5. The image processing apparatus according to claim 1, wherein the process judgment section:
- judges whether or not a condition that a pixel value of a current pixel included in the image data after the conversion is smaller than a predetermined value, and there is a pixel of a pixel value larger than the predetermined value around the current pixel is satisfied; and
- judges that the process for superimposing is performed when the process judgment section judges that the condition is satisfied.

6. An image forming apparatus, comprising:
- the image processing apparatus according to claim 1; and
- an image forming section for performing image formation based on output image data generated by the image processing apparatus.

7. An image processing method for performing, when output image data is generated from input image data having a plurality of color components, a process for superimposing a pixel having the plurality of color components with respect to an edge extracted based on the input image data, comprising:
- a step of judging whether or not resolution of input image data is not less than a predetermined value;
- a step of converting resolution of the input image data to resolution less than the predetermined value when it is judged that the resolution of the input image data is not less than the predetermined value;
- a judgment step of judging whether or not the process for superimposing a pixel having a plurality of color components is performed with respect to an edge extracted based on the image data after conversion;
- a step of determining a color component of the pixel to be superimposed when it is judged that the process for superimposing is performed;
- a step of converting resolution of pixel data based on the determined color component to the resolution of the input image data; and
- a step of performing a process for superimposing the input image data on the pixel data after conversion.

8. The image processing method according to claim 7, further comprising:
- a reception step of receiving resolution of output image data;
- a step of judging whether or not the received resolution is not less than a predetermined value;
- a conversion step of converting resolution of the input image data to the received resolution when it is judged that the resolution of the input image data is less than the predetermined value, and the received resolution is not less than the predetermined value;
- a step of judging whether or not the process for superimposing is performed with respect to the input image data when the resolution of the input image data is converted to the received resolution;
- a step of converting resolution of the pixel data based on the determined color component to the received resolution; and
- a step of performing a process for superimposing the pixel data after conversion on the image data after conversion.

9. The image processing method according to claim 8, wherein the conversion step includes:
- generating an interpolation pixel for the input image data;
- calculating a color difference between the generated interpolation pixel and a pixel of the input image data closest to the interpolation pixel;
- changing a pixel value of the interpolation pixel to a pixel value of the pixel of the input image data when the calculated color difference is less than a predetermined value; and
- changing the pixel value of the interpolation pixel to a pixel value of a pixel of the input image data situated at a predetermined position relative to the interpolation pixel when the calculated color difference is not less than the predetermined value.

10. The image processing method according to claim 7, wherein the judgment step includes:
- extracting an edge based on the image data after conversion;

judging a direction in which there is the pixel of a color similar to that of a current pixel included in the image data after conversion, based on the extracted edge; and judging whether or not the process for superimposing is performed based on a judgment result.

11. The image processing method according to claim 7, wherein the judgment section includes:

judging whether or not a condition that a pixel value of a current pixel included in the image data after the conversion is smaller than a predetermined value, and there is a pixel of a pixel value larger than the predetermined value around the current pixel is satisfied; and judging that the process for superimposing is performed when it is judged that the condition is satisfied.

12. A non-transitory computer-readable recording medium recording a computer program which causes a computer to perform, when output image data is generated from input image data having a plurality of color components, a process for superimposing a pixel having the plurality of color components with respect to an edge extracted based on the input image data, the computer program comprising:

a resolution judgment step of causing the computer to judge whether or not resolution of input image data is not less than a predetermined value;

a first conversion step of causing the computer to convert resolution of the input image data to resolution less than the predetermined value when it is judged that the resolution of the input image data is not less than the predetermined value at the resolution judgment step;

a process judgment step of causing the computer to judge whether or not the process for superimposing a pixel having a plurality of color components is performed with respect to an edge extracted based on the image data after conversion at the first conversion step;

a determination step of causing the computer to determine a color component of the pixel to be superimposed when it is judged that the process for superimposing is performed at the process judgment step;

a second conversion step of causing the computer to convert resolution of pixel data based on the color component determined at the determination step to the resolution of the input image data; and a superimposition step of causing the computer to perform a process for superimposing the input image data on the pixel data after conversion at the second conversion step.

* * * * *